United States Patent
Deluca

(10) Patent No.: US 11,350,071 B2
(45) Date of Patent: May 31, 2022

(54) AUGMENTED REALITY BASED USER INTERFACING

(71) Applicant: Michael J. Deluca, Boca Raton, FL (US)

(72) Inventor: Michael J. Deluca, Boca Raton, FL (US)

(*) Notice: Subject to any disclaimer, the term of this patent is extended or adjusted under 35 U.S.C. 154(b) by 0 days.

(21) Appl. No.: 16/505,189

(22) Filed: Jul. 8, 2019

(65) Prior Publication Data

US 2019/0342536 A1  Nov. 7, 2019

Related U.S. Application Data

(63) Continuation of application No. 14/905,698, filed as application No. PCT/US2014/047995 on Jul. 24, 2014, now Pat. No. 10,349,031.

(Continued)

(51) Int. Cl.
*H04N 13/106* (2018.01)
*G06F 3/13* (2006.01)
(Continued)

(52) U.S. Cl.
CPC ......... *H04N 13/106* (2018.05); *G02B 27/017* (2013.01); *G02B 27/0172* (2013.01); *G06F 3/011* (2013.01); *G06F 3/013* (2013.01); *G06V 40/161* (2022.01); *H04N 13/239* (2018.05); *H04N 13/332* (2018.05); *H04N 13/344* (2018.05); *H04N 13/368* (2018.05);
(Continued)

(58) Field of Classification Search
CPC ............ G06K 9/00228; G02B 27/0172; G02B 2027/0138; G02B 2027/014; H04N 13/0007; H04N 13/044; H04N 13/0239
See application file for complete search history.

(56) References Cited

U.S. PATENT DOCUMENTS 6,064,354 A * 5/2000 DeLuca ............... H04N 13/156
345/7
6,243,054 B1 6/2001 Deluca
(Continued)

OTHER PUBLICATIONS

Patterson R. E. (2013). Interactive stereoscopic displays. Journal of the Society for Information Display, 21(3), 142-150. 2019.
(Continued)

*Primary Examiner* — Tsion B Owens
(74) *Attorney, Agent, or Firm* — Fleit Intellectual Property Law; Jon Gibbons

(57) ABSTRACT

A display system renders a motion parallax view of object images based upon multiple observers. Also, a headset renders stereoscopic images that augment either physical objects viewed through the headset, or virtual objects projected by a stereoscopic display separate from the headset, or both. The headset includes a system for locating both physical objects and object images within a stereographic projection. Also, a proprioceptive user interface defines interface locations relative to body parts of an observer, the body parts include the head and the shoulders of the observer. The observer may enable a process associated with the interface location by indicating an intersection with the interface location with a physical object, such as a wand or a finger of the observer.

20 Claims, 15 Drawing Sheets

Related U.S. Application Data

(60) Provisional application No. 61/911,020, filed on Dec. 3, 2013, provisional application No. 61/878,257, filed on Sep. 16, 2013, provisional application No. 61/859,264, filed on Jul. 28, 2013.

(51) Int. Cl.
| | |
|---|---|
| *H04N 13/344* | (2018.01) |
| *H04N 13/368* | (2018.01) |
| *G06F 3/01* | (2006.01) |
| *G02B 27/01* | (2006.01) |
| *H04N 13/332* | (2018.01) |
| *H04N 13/239* | (2018.01) |
| *G06V 40/16* | (2022.01) |

(52) U.S. Cl.
CPC ............... *G02B 2027/014* (2013.01); *G02B 2027/0134* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 6,353,764 B1 | 3/2002 | Imagawa et al. | |
| 6,417,969 B1* | 7/2002 | DeLuca | H04N 13/122 359/630 |
| 6,559,813 B1 | 5/2003 | Deluca et al. | |
| 6,803,928 B2* | 10/2004 | Bimber | G05B 19/186 345/419 |
| 8,279,168 B2* | 10/2012 | Glomski | G06F 3/04842 345/156 |
| 9,225,969 B2* | 12/2015 | Aguirre-Valencia | ... G06T 15/20 |
| 9,300,951 B2* | 3/2016 | Krah | H04N 13/363 |
| 9,824,499 B2* | 11/2017 | Wright | G06F 3/013 |
| 9,846,965 B2* | 12/2017 | Mitchell | G06T 19/006 |
| 2012/0026157 A1 | 2/2012 | Unkel et al. | |
| 2012/0242829 A1 | 9/2012 | Shin et al. | |
| 2013/0083003 A1* | 4/2013 | Perez | A63F 13/422 345/419 |
| 2013/0249947 A1* | 9/2013 | Reitan | G06T 19/006 345/633 |

OTHER PUBLICATIONS

Mine M. R., Brooks, Jr, F. P., & Sequin C. H. (Aug. 1997). Moving objects in space: exploiting proprioception in virtual-environment interaction. In Proceedings of the 24th annual conference on Computer graphics and interactive techniques (pp. 19-26). ACM Press/Addison-Wesley Publishing Co. 1997.

Krueger W., & Froehlich, B. (1994). Responsive Workbench. In Virtual Reality'94 (pp. 73-80). Springer Berlin Heidelberg. 2014.

Grawala, M., Beers, A. C., McDowall I., Frohlich B., Bolas, M., & Hanrahan P. (Aug. 1997). The two-user Responsive Workbench: support for collaboration through individual views of a shared space. In Proceedings of the 24th annual conference on Computer graphics and interactive techniques (pp. 327-332). ACM Press/Addison-Wesley Publishing Co. 1997.

Hinckley K., Pausch, R., Profitt, D., & Kassell, N. F. (1998). Two-handed virtual manipulation. ACM Transactions on Computer-Human Interaction (TOCHI), 5(3), 260-302. 1999.

\* cited by examiner

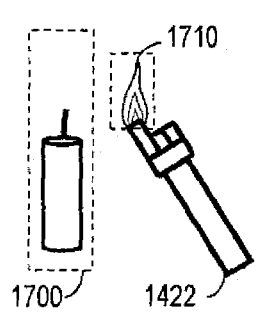 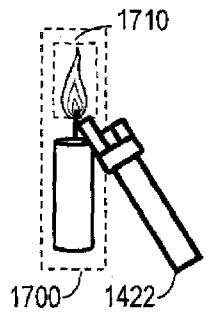 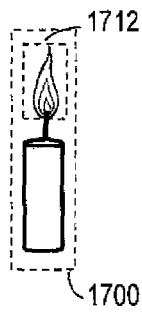 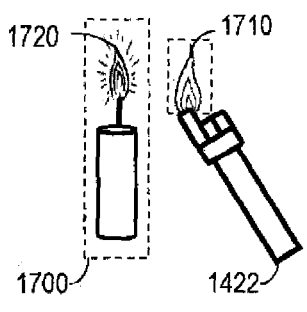
FIG. 17A  FIG. 17B  FIG. 17C  FIG. 17D
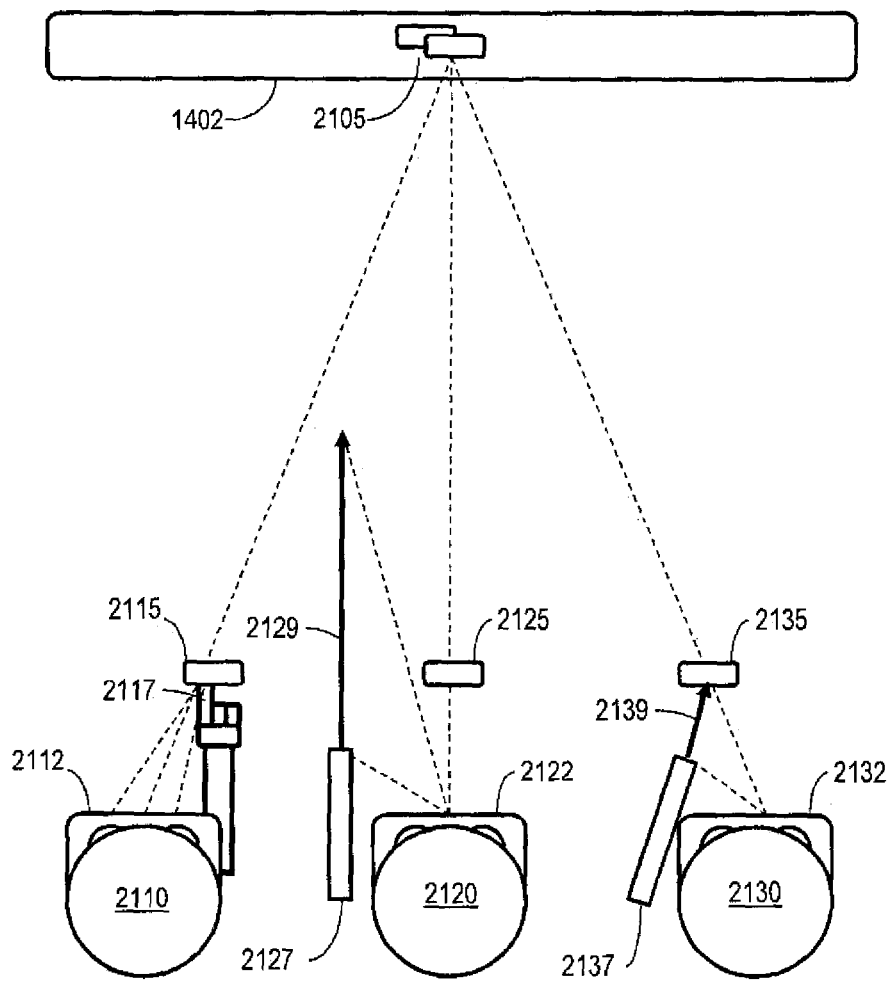
FIG. 21

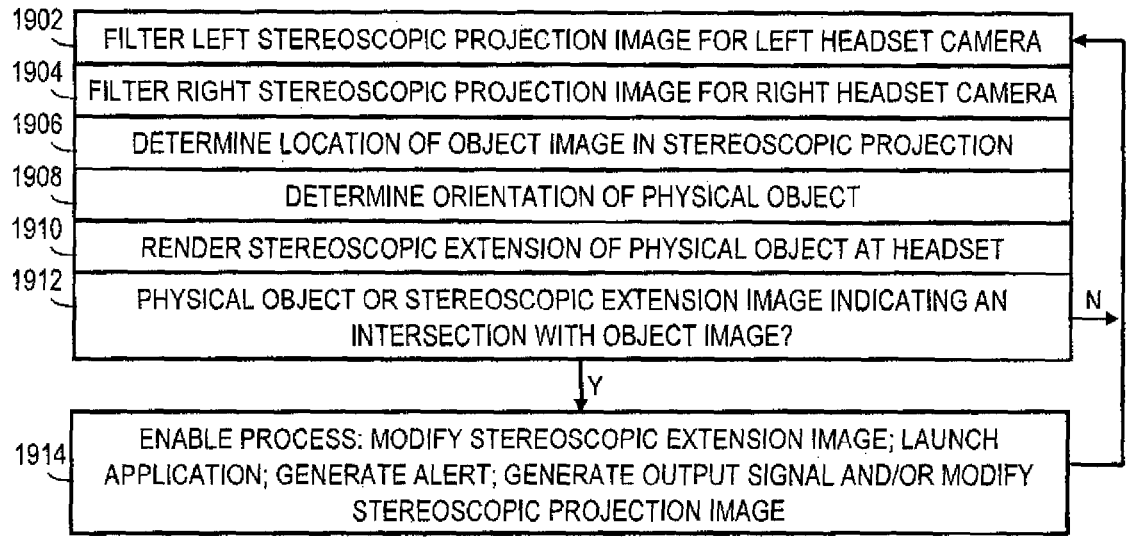
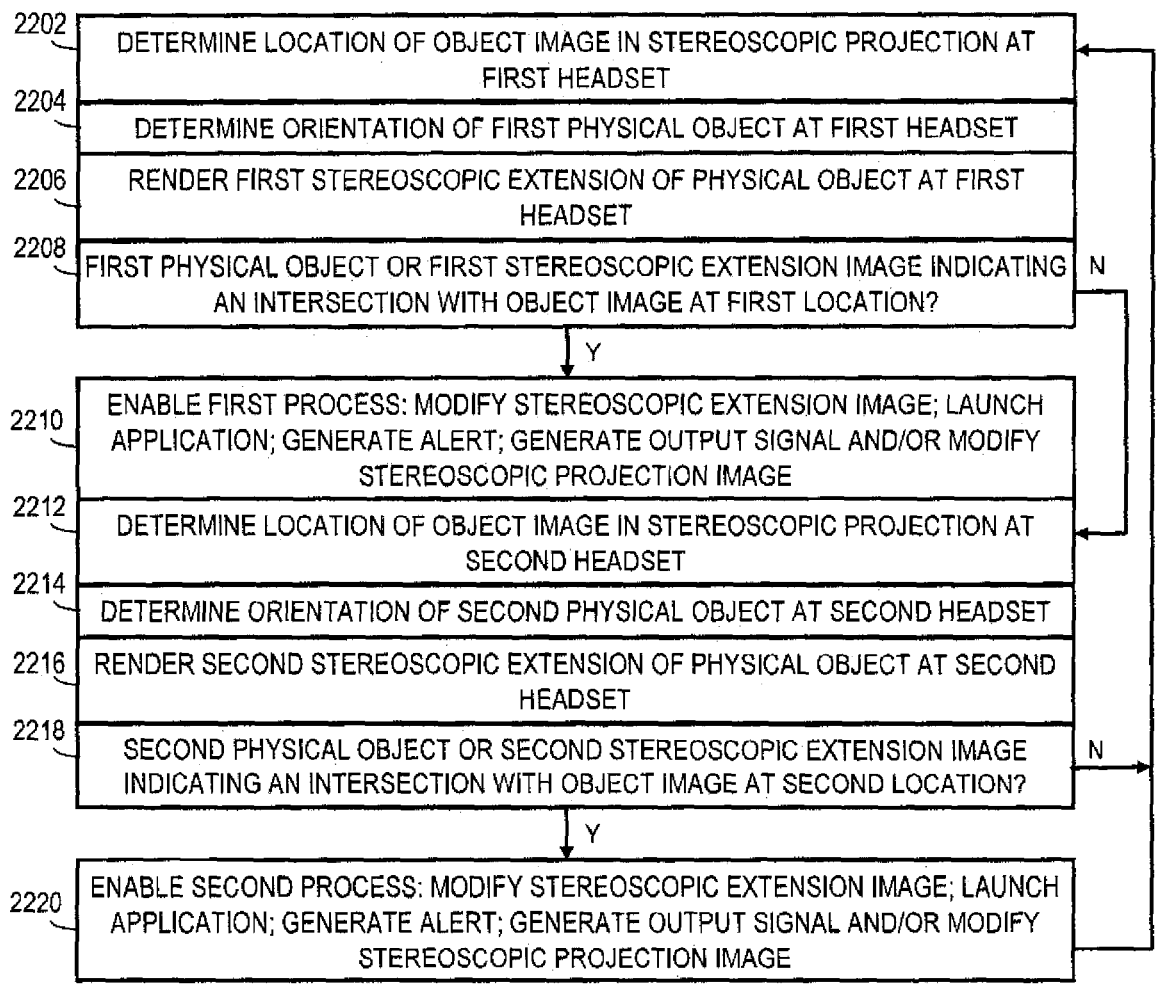

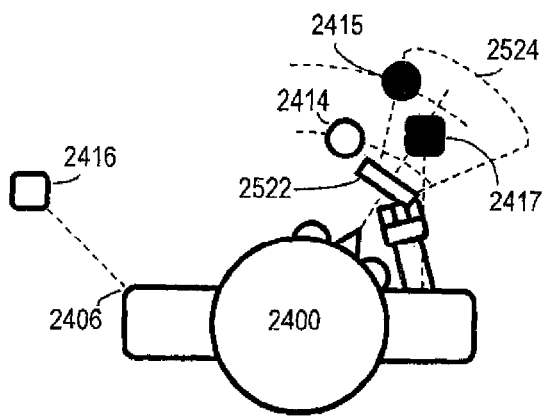
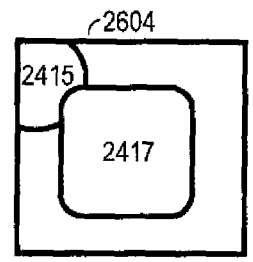
FIG. 29         FIG. 30
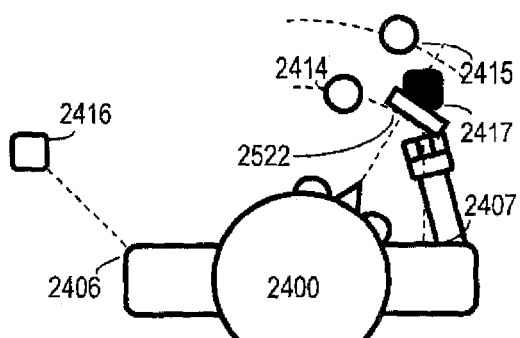
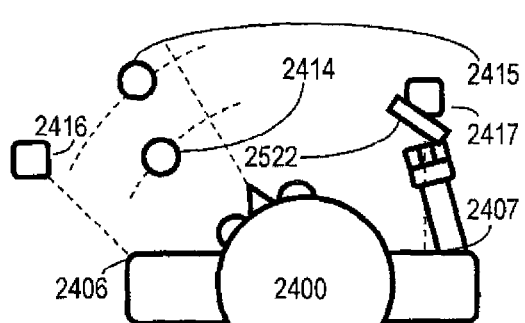
FIG. 31         FIG. 32
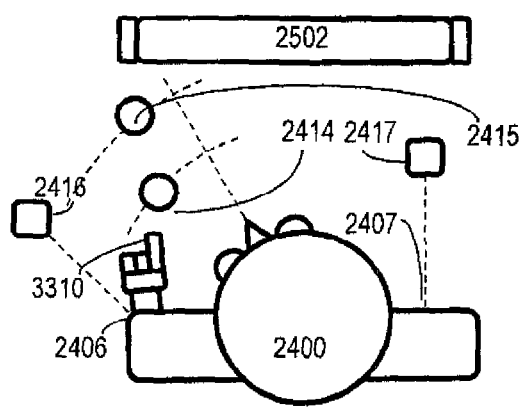
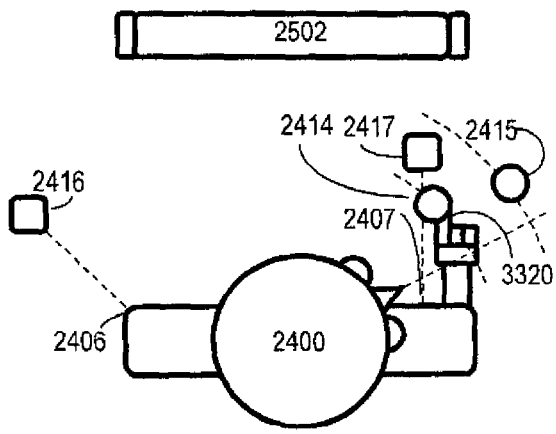
FIG. 33A         FIG. 33B

AUGMENTED REALITY BASED USER INTERFACING

CROSS REFERENCE TO RELATED APPLICATIONS

This Application claims the benefit under 35 USC § 119(e) to: U.S. patent application Ser. No. 14/905,698 filed Jan. 15, 2016 entitled "AUGMENTED REALITY BASED USER INTERFACING", which claims priority to PCT Application PCT/US14/47995 filed Jul. 24, 2014 and entitled "AUGMENTED REALITY BASED USER INTERFACING", which claims priority to U.S. Provisional Patent Application 61/859,264 filed Jul. 28, 2013 and entitled "MULTIPLE OBSERVER DISPLAY WITH MOTION PARALLAX"; U.S. Provisional Patent Application 61/878,257 filed Sep. 16, 2013 and entitled "AUGMENTATION OF A VIRTUAL REALITY OBJECT"; and U.S. Provisional Patent Application 61/911,020 filed Dec. 3, 2013 and entitled "PROPRIOCEPTIVE USER INTERFACE", all of which are hereby incorporated by reference in their entirety.

FIELD

The present disclosure generally relates to stereoscopic user interfaces, including augmentation of a virtual reality object projected by a stereoscopic display.

BACKGROUND

I. Motion Parallax

Motion parallax stereoscopic display systems are currently enabled in products such as the Learndo 3D terminal, the zSpace terminal, and EON Reality's Ibench and Imobile devices. Motion parallax allows a virtual object to appear stationary in real space when an observer changes perspective. Thus, even though an observer's head is moving, a virtual object appears in a fixed space and the observer can "look around" surfaces of the virtual object. Motion parallax enhances the natural user interface experience afforded by the mixing virtual and real objects in user interface and other applications. FIG. 1 shows an example of a prior art motion parallax stereoscopic display system. An observer in a first position 100A is observing a stereoscopic display 102 projecting a stereoscopic image of a first object image 104 located front and center relative to the display 102 and a second object image 106 located behind and on the left side relative to the display 102. A tracking system 106 has stereo cameras that track the position and motion of the first observer. In order to make object images 104 and 106 appear at their locations, a pair of stereoscopic images 114A and 116A are rendered on the display 102 for the left and right eyes of the observer in a manner known to those familiar with the art. A physical object 120A is operated by the first observer in order to interact with the object images 104 and 106. The position and orientation of the physical object is determined by tracking system 108 and in one example, a stereoscopic extension image 122A of the object is projected by the stereoscopic display. When an intersection of the stereoscopic extension image and the object image 104 or 106 is detected, an appropriate response is generated. One response may be to open an application such as a word processing application. Such a system is described in U.S. Pat. No. 6,243,054 entitled Stereoscopic User Interface Method and Apparatus, issued Jun. 5, 2001 to Michael DeLuca, and is hereby incorporated by reference.

When the first observer moves to a second position 100B, a motion parallax process is used to render the stereoscopic pair of images 114B and 116B to cause the first and second object images 104 and 106 to appear in substantially constant locations relative to the display 102 even though the observer has moved to a different position. Physical object 120B and its stereoscopic extension image 122B are shown to continue to intersect object image 104 because the observer has changed the position and orientation of the real object in response to the position and motion of the observer. Display versions 102A and 102B show a two dimensional representation of the object images 104 and 106 viewed at positions 100A and 100B respectively. Object images 104A and 104B appear larger than object images 106A and 106B because it is closer to the observer. Display 102A shows object image 104A partially obscuring object image 106A because of the observer's position 100A, while display 102B shows object image 104B well to the right of object image 106B because of the observer's position 100B. The system allows for the simultaneous viewing of both virtual object images 104 and 106 and real physical objects, including physical object 120 which is shown as extending beyond the display 102A and 102B as 120A and 120B. Display 102A and 102B also show the stereoscopic extension image 122A and 122B being rendered with motion parallax relative to the physical object.

Motion parallax provides for a natural user interface experience for the first observer. A second observer simply views the images as rendered for the first observer, which results in an experience different from the natural user interface experience of the first observer.

II. Augmented Virtual Reality

Turning to the augmentation of a virtual reality object, head mounted devices are being introduce that allow for augmentation of real objects. For example, U.S. Pat. No. 6,559,813 to DeLuca et al. shows a headset that displays augmented information to an observer also observing a real image. The headset includes a camera system and a projector. The headset camera system monitors the physical objects also viewed by the observer wearing the headset, and the headset projector projects an image that augments the physical objects. In one example, an observer is viewing the Parthenon and a virtual image including additional information regarding the Parthenon is projected by the headset so the observer is able to view both the Parthenon and augmented information regarding the Parthenon. Such devices are currently being introduced including Google's Google Glass, Atheer Labs' headset, and Meta's Space Glasses.

U.S. Pat. No. 6,559,813 also describes an image obstruction generator for blocking portions of a real image. In one example, the obstruction generator may block a bright portion of the real image, which may enhance viewing of other real and/or virtual objects in the field of view of the observer. Products which implement such an obstruction generator covered by the patent are being introduced and include the sunglasses made by Dynamic Eye.

U.S. Pat. No. 6,559,813 also describes a headset that projects a stereoscopic display wherein physical objects, such as a finger or hand of the observer, or a pointer held by the observer may interact with stereoscopic objects projected by the display based upon a determined intersection between the physical object and the virtual object. Headset products which implement intersections between virtual and real objects are being introduced and include the Atheer Labs' headset and Meta's Space Glasses.

Thus, headsets have been provided that produce images that interact with real objects within view of an observer. This is currently being associated with the term "natural user interface". An observer may be able to view and interact with a stereoscopic image projected by a headset projector as if the projected object image was a real object. However, headsets are incapable of interacting with a virtual object image projected by a stereoscopic display separate from the headset, such a display of a 3D movie, a zSpace terminal, or other stereoscopic projection.

III. Proprioceptive User Interface

Turning now to proprioception, proprioception is a characteristic natural to humans that describes an individual's sense of the relative positions of neighboring parts of their body. For example, one's ability to touch the nose on their face with their eyes closed or one's ability to instinctively operate an automobile without looking at the foot pedals, gear shifter, or steering wheel is attributed to proprioception. Much of proprioception is learned through visual feedback, and once learned, the individual can rely on muscle memory to complete an operation, without requiring visual feedback. For example, after an individual sees the location of automobile foot pedals and sees their feet operating the pedals, the location of the foot pedals is retained in muscle memory and the individual may only need to occasionally look at the pedal locations again to operate the automobile.

When an individual operates a graphical user interface to a computerize system, numerous interface icons may be rendered within the system's display area to allow a user to select which functionality of the computerized system is desired. A typical user interface home screen may have dozens or more interface icons for accessing a network, the Internet, often used applications, hard drive directories, file deletion functionality and other often used files. These icons have the benefit of allowing for quick access to processes associated with icons, however they have a detriment in that they obscure the display area for other relevant information. For example, a computer automated design (CAD) application may be optimal if it occupies the entire area of a display, but if the user also needs occasional Internet access, either the display area of the CAD application while using the application is reduced to allow for viewing of the Internet icon, thereby diminishing the CAD application experience, or the user wanting to access the Internet while using the CAD application must be reduced or the display area of the CAD application window to reveal the Internet access icon, and then select the icon, thereby taking extra process steps and operating time, ultimately diminishing the user interface experience.

A user of such a computer system moves frequently during its operation, and the location of the icons relative to the operator's body varies widely, as such applications are not able to use proprioception to resolve the above stated problems. Furthermore, stereoscopic user interfaces such as 3D terminals made Learndo 3D, zSpace, and EON Reality and the 3D terminal described in U.S. Pat. No. 6,559,813, describe detecting an intersection between a virtual object and a real object as perceived by an observer. Additionally, headsets from Atheer Labs and Meta and the 3D headset described in U.S. Pat. No. 6,559,813, also describe detecting an intersection between a virtual object and a real object in a space relative to an observer. Furthermore, portable display devices such as cellphones, tablets, eBooks, and video games are able to move through a space relative to an observer while rendering augmented images relative to the space. Such devices ignore the natural human characteristic of proprioception in their user interfaces.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 17A-FIG. 17D illustrate examples of augmentation of a virtual reality object image;

FIG. 19 illustrates a representative flow diagram for determining an intersection with an object image;

FIG. 21 illustrates a representative diagram of multiple observers observing and intersecting an object image projected by a stereoscopic display;

FIG. 22 illustrates and example of a flow diagram for determining intersections with an object image projected by a stereoscopic display and determined to be located in multiple locations relative to each of the multiple headsets;

FIG. 29 shows a portable device having a display system and operating a proprioceptive user interface;

FIG. 30 shows object images rendered on the display of the portable device of FIG. 29 that augment the interface locations within the limited display area of the portable device;

FIG. 31 shows an example of the portable device of FIG. 29 operating a proprioceptive user interface that is rendering an object image augmenting an interface location while acting as a physical object for indicating an intersection with the interface location located relative to a body part of an observer;

FIG. 32 shows an example of the portable device of FIG. 29 operating a proprioceptive user interface that is not necessarily rendering an object image augmenting an interface location while acting as a physical object for indicating an intersection with the interface location located relative to a body part of an observer;

FIG. 33A and FIG. 33B show an example of a stereoscopic terminal operating a proprioceptive user interface wherein an interface location is moving with a body part of the observer and the observer is intersecting an interface location with either a left hand or a right hand;

DETAILED DESCRIPTION

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

I. Multiple Observer Display with Motion Parallax

Figure 1:
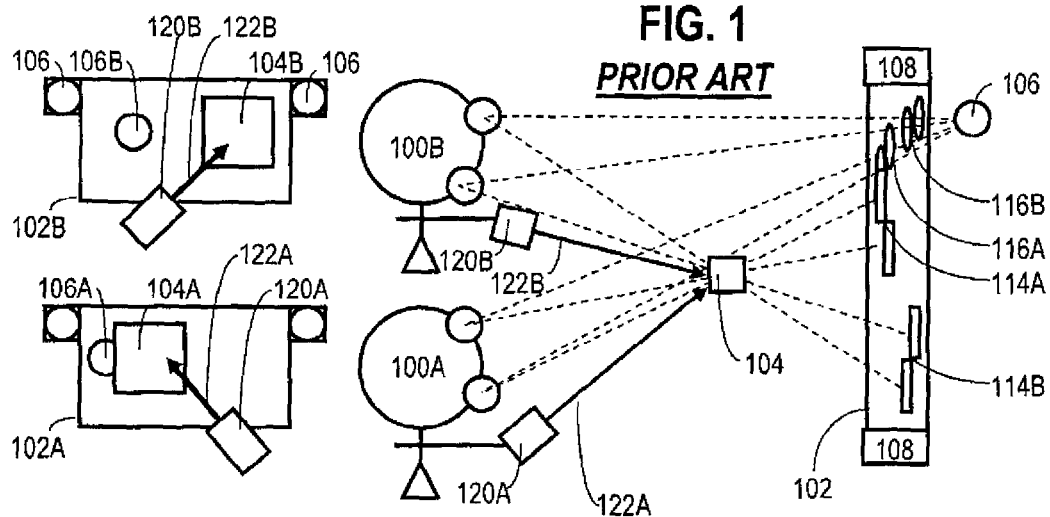
FIG. 1 shows an example of a prior art motion parallax stereoscopic display system.
Figure 2A:
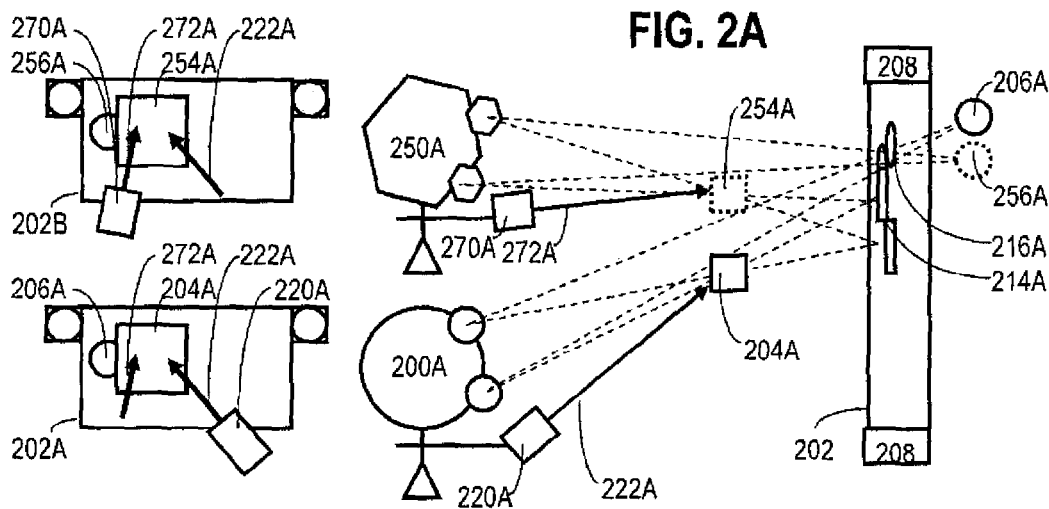
FIG. 2A and FIG. 2B illustrate examples of a multiple observer display with motion parallax.
Figure 2B:
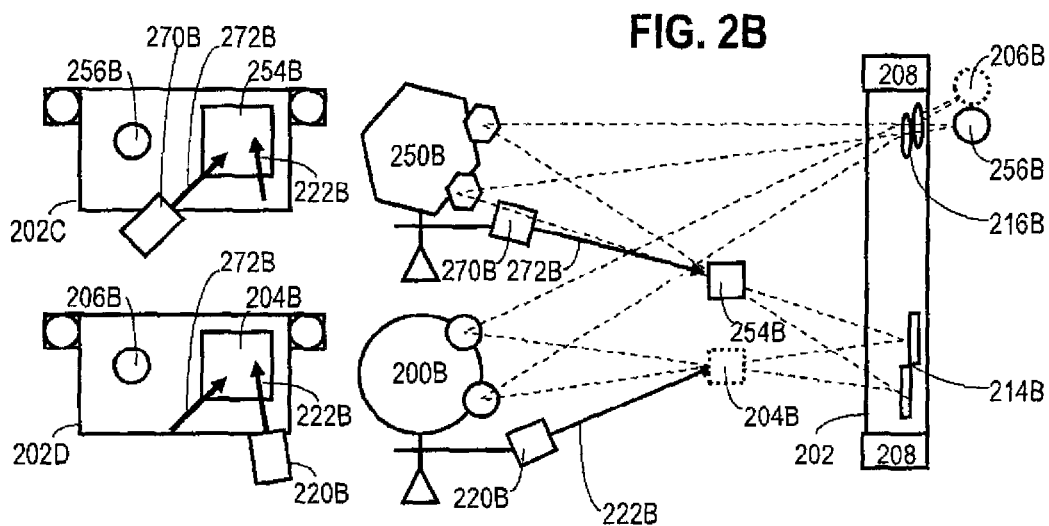

FIG. 2A and FIG. 2B illustrate examples of a multiple observer display with motion parallax. In FIG. 2A, the parallax view of object images 204A and 206A are rendered on display 202 with stereoscopic image pairs 214A and 216A respectively in response to the position and motion of a first observer 200A as determined by tracking system 208 as described with respect to FIG. 1. Because of the properties of stereoscopic rendering, the second observer 250A does not perceive the first object in the same location relative to the display as the first observer 200A. Because both observers are observing the same stereoscopic image pairs 214A and 216A rendered on display 202, the second observer 250A perceives the first object ima1402ge at a location 254A while the first observer perceives the first object image at the location 204A. Similarly, the second observer 250A perceives the second object image at a location 256A while the first observer perceives the second object at the location 206A. Furthermore, due to the motion parallax processes the first observer 200A perceives the first and second object images 204A and 206A (shown in solid lines) to be substantially stationary relative to the display 202 as the first observer motion results in a change in position. However, the perceived locations of first and second object images 254A and 256A by the second observer (shown in dashed lines) change not only in response to the motion and position of the second observer because the motion parallax process is responsive to the first observer, but further in response to the motion and position of the first observer as the stereoscopic image pairs 214A and 216A are re-rendered by the motion parallax process to maintain a substantially constant location relative to the display for the first observer 200A.

The tracking system 208 determines the position and orientation of the physical object 220A operated by the first observer 200A and determines an extension vector 222A. For example, as is known to those familiar with the art, the real object may be a finger, a wand or pointer with fiducial marks to facilitate location by the tracking system, and in response an extension vector 222A is calculated to extend from the physical object towards the display. A stereoscopic extension image may be rendered based upon the extension vector. For example, the stereoscopic extension image may appear as a laser beam emanating from the physical object. In other examples, the physical object may be a finger of the observer and the stereoscopic image may be a paint brush tip or lightning bolt or may appear as an illuminated area when intersecting a rendered object image. The first stereoscopic extension image is rendered for physical object 220A further in response to the first observer 200A motion parallax process. When an intersection between the first observer's perceived location of an object image, such as object image 204A intersecting extension vector 222A, then a process enabling response is enabled. The response could be launching of an application, such as a word processing application, or enable a motion or other modification of the object image 204A.

The tracking system 208 further determines the position and orientation of the second observer 250A and second physical object 270A operated by the second observer 250A and determines a second extension vector 272A. The second stereoscopic extension image rendered for second physical object 270A is rendered with a second observer 250A motion parallax process based upon the position and motion of the second observer. When an intersection between the second observer's perceived location of an object image, such as object image 254A intersecting extension vector 272A, then a process enabling response is enabled. The response could be launching of an application, such as a word processing application, or a motion or other modification of the object image 204.

In another example, the extension vector is not required, and the intersection with the object image could correspond to the physical object itself intersecting with the object image. In this example, the physical object could be a wand, pointer or an observer's finger. When determining an intersection with the first object image, the intersection would be determined when the first observer's finger intersected a first location corresponding to 204A, or the second observer's finger intersection a second location corresponding to 254A. After determining the intersection, the corresponding process can be enabled.

An example of a process being enabled in response to the second observer 250A causing second physical object 270A to intersect with the perceived location of the first object image 254A is to modify the motion parallax process to render the first object image based upon the position and motion of the second observer rather than the first observer. Thus, the second observer obtains motion parallax control of the first object image by intersecting it at its perceived location. The parallax rendering of the second object image 256A can also be based upon the position and motion of the second observer in response to the second observer causing the second physical object to intersect the first object image at its perceived location 254A. In another example, the parallax rendering of the second object image 256A can remain based upon the position and motion of the first observer independent of the second observer causing the second physical object to intersect the first object image at its perceived location 254. In this example, the motion parallax view of the first object image is rendered based upon the position and movement of the second observer and the second object image is rendered based upon the position and motion of the first observer.

In these examples, the first stereoscopic extension image (if rendered) is rendered in response to both the position and motion of the first observer 200A and the position and orientation (and motion) of the first real object 220A. Further, the second stereoscopic extension image (if rendered) is rendered in response to both the position and motion of the second observer 250A and the position and orientation (and motion) of the second real object 270A.

Display 202A shows the first observer's view of the display. First object image 204A is in front of second object image 206A. Also note that first object image 204A is rendered larger than second object image 206A because first object image 204A is closer to the first observer than the second object image, even though they may be similarly sized in a volumetric space defining the first and second object images. The first physical object 220A and in this example a (laser beam) first stereoscopic extension image corresponding to first extension vector 222A are also seen by the first observer. Furthermore, while the second physical object 270A may not be in the field of view of the first observer, in this example a (laser beam) second stereoscopic extension image corresponding to second extension vector 272A is seen by the first observer.

Display 202B shows the second observer's view of the display. First object image 254A is in front of second object image 256A. The second physical object 270A and in this example a (laser beam) second stereoscopic extension image corresponding to second extension vector 272A are also seen by the second observer. Furthermore, while the first physical object 220A may not be in the field of view of the second observer, in this example the (laser beam) first stereoscopic extension image corresponding to first extension vector 222A is seen by the second observer.

In FIG. 2B, the parallax view of object images 254B and 256B are rendered on display 202 with stereoscopic image pairs 214B and 216B respectively based upon the position and motion of the second observer 250B as determined by tracking system 208. For purposes of illustration, first object image 254B corresponds to the same location first object image 204A relative to the display except that the motion parallax perspective is rendered based upon the position and movement of the second observer 250B instead of the first observer 200A of FIG. 2A. Similarly, second object image 256B corresponds to the same location first object image 206A except that the motion parallax perspective is rendered based upon the position and movement of the second observer 250B rather than the first observer 200A of FIG. 2A. Correspondingly, first and second stereoscopic object image pairs 214B and 216B are rendered at different locations on the display 202 when compared to first and second object image pairs 214A and 216A of FIG. 2A.

Because of the properties of stereoscopic rendering, the first observer 200B does not perceive the first and second objects in the same location relative to the display as the second observer 250B. Because both observers are observing the same stereoscopic image pairs 214B and 216B rendered on display 202, the first observer 200B perceives the first object image at a location 204B while the second observer perceives the first object image at the location 254B. Similarly, the second observer 250B perceives the second object image at a location 256B while the first observer perceives the second object at the location 206B. Furthermore, due to the motion parallax processes the second observer 250B perceives the first and second object images 254B and 256B (shown in solid lines) to be substantially stationary relative to the display 202 as the second observer motion results in a change in position of the second observer. However, the perceived locations of first and second object images 204B and 206B by the first observer (shown in dashed lines) change not only in response to the motion and position of the first observer because the motion parallax process based upon the second observer, but further in response to the motion and position of the second observer as the stereoscopic image pairs 214B and 216B are re-rendered by the motion parallax process to maintain a substantially constant location relative to the display for the second observer 250B.

The tracking system 208 determines the position and orientation of the physical objects 220B and 270B operated by the first and second observers 200B and 250B respectively, and determines corresponding extension vectors 222B and 272B and enables rendering of corresponding stereoscopic extension images (if any) such a laser beams, arrows, end effectors etc.

Display 202C shows the second observer's view of the display. First object image 254B is to the right of second object image 256B. Also note that first object image 254B is rendered larger than second object image 265B because first object image 254B is closer to the second observer than the second object image, even though they may be similarly sized in a volumetric space defining the first and second object images. The second physical object 270B and in this example a (laser beam) second stereoscopic extension image corresponding to second extension vector 272B are also seen by the second observer. Furthermore, while the first physical object 220B may not be in the field of view of the second observer, in this example a (laser beam) first stereoscopic extension image corresponding to second extension vector 222B is seen by the second observer.

Display 202D shows the first observer's view of the display. First object image 204B is to the right of second object image 206B. The second physical object 220B and in this example a (laser beam) second stereoscopic extension image corresponding to second extension vector 222B are also seen by the first observer. Furthermore, while the second physical object 270B may not be in the field of view of the first observer, in this example the (laser beam) second stereoscopic extension image corresponding to first extension vector 272B is seen by the first observer.

In FIG. 2A, the first and second object images are rendered with a motion parallax process based upon the first observer and in FIG. 2B the first and second object images are rendered with the motion parallax process based upon the second observer. The tracking system tracks both the first and second observers and their physical objects and determines an intersection where the object image is perceived, even though the first and second observers perceive the object images in different locations relative to the display and an object image is rendered using a motion parallax process based upon the position and location of one of the observers. In response to the determined intersection, any of a number of processes may be enabled, including modifying the motion parallax rendering of the intersected object image such that it is rendered be based upon the observer causing the intersection.

The tracking system can determine that first physical object 220A is being operated or controlled by the first observer 200 by optically analyzing tracking system imaging to determine the physical object is held or in contact with the first observer. Alternately tracking system 208 can distinguish physical object 220A and 220B and associate physical first object 220A with the first observer 200A in response to a predetermined association or a facial recognition of the first observer. Other known approaches for associating a physical object with an observer are considered to be included in the scope of the disclosure.

Figure 3A:
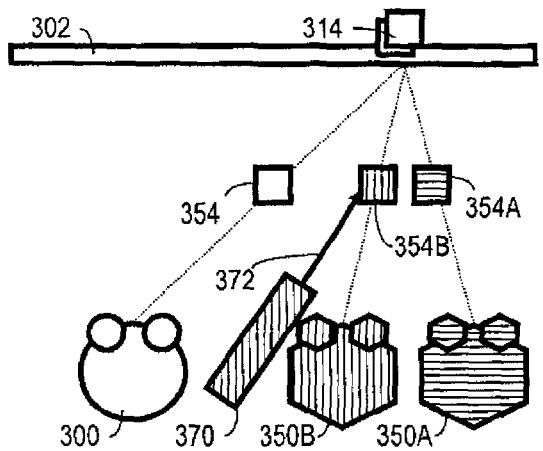
FIG. 3A and FIG. 3B illustrate an example of a motion parallax rendering of an object image shifting from a stationary first observer to a moving second observer.
Figure 3B:
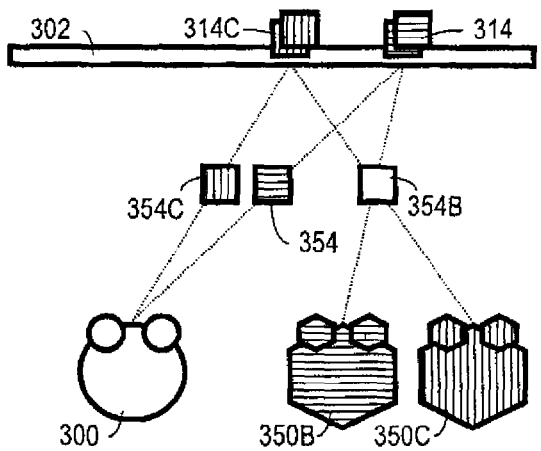

FIG. 3A and FIG. 3B illustrate an example of a motion parallax rendering of an object image shifting from a stationary first observer to a moving second observer. Rendered on display 302 is a stereoscopic image pair 314 that results in projection of an object image at location 354 from the perspective of a stationary first observer 300. The motion parallax rendering of the object image is based upon the first observer, as indicated by the object image 354 of FIG. 3A having no internal hashing marks. Consequently, a second moving observer moving from positions 350A to position 350B perceives the object image location as varying from location 354A to 354B. If while at position 350B, the second observer intersects the object image at location 354B with a real object 370 and an extension vector 372, then the motion parallax rendering of the object image shifts from being based upon the position and movement of the first observer to the position and movement of the second observer. FIG. 3B shows the second observer moving from position 350B to position 350C, which in this example corresponds to moving back to position 350A of FIG. 3A. The perceived location 354B of the object image is not shown to change for the second observer in FIG. 3B because motion parallax rendering of the object image is based upon the position and motion of the second observer, as indicated by the object image 354B of FIG. 3B having no internal hashing marks. However, the first observer does perceive the object image as changing from location 354 to location 354C in response to the motion and position of the second observer.

FIG. 3A and FIG. 3B show an example of enabling a physical object 370 to be observable by a second observer 350A, 350B, 350C in the space in addition to an object image 354A. 354B, determining the physical object indicating an intersection 372, 354B with the variable location projection 354A, 354B of the object image, and generating an input signal based upon the determining that enables the motion parallax rendering the process to render the object image based upon the second observer instead of the first observer.

Figure 4A:
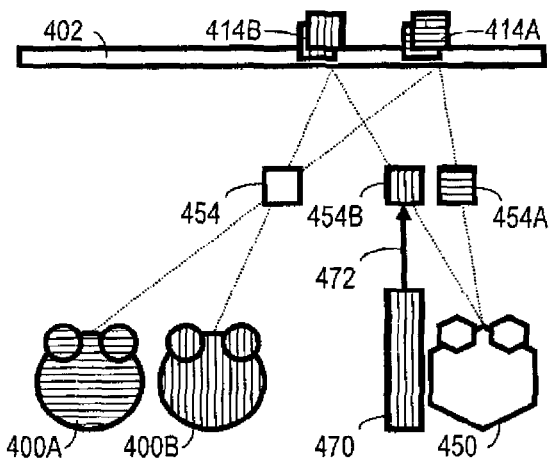
FIG. 4A and FIG. 4B illustrate an example of a motion parallax rendering of an object image shifting from a moving first observer to a stationary second observer.
Figure 4B:
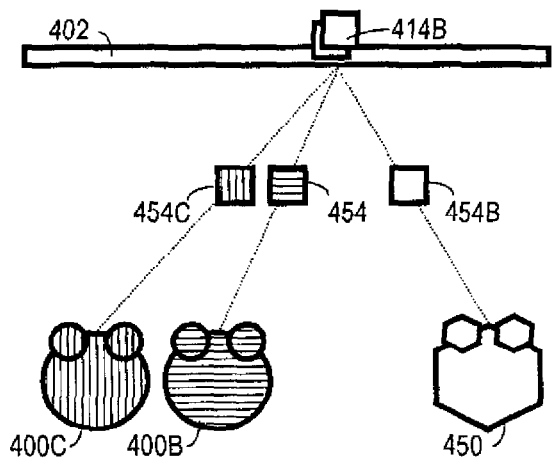

FIG. 4A and FIG. 4B illustrate an example of a motion parallax rendering of an object image shifting from a moving first observer to a stationary second observer. Rendered on display 402 is a stereoscopic image pair 414A that result in projection of an object image at location 454 from the perspective of a first observer moving from 400A to 400B. The motion parallax rendering of the object image is based upon the first observer, as indicated by the object image 454 of FIG. 4A having no internal hashing marks. In response to the first observer moving from position 400A to position 400B, the rendering of the stereoscopic image pair correspondingly moves from 414A to 414B to provide for the motion parallax view of the object image based upon the first observer. Consequently, a second stationary observer at position 450 perceives the object image location as varying from location 454A to 454B in response to the first observer moving between positions 400A to 400B. If while the first observer is at position 400B, the second observer intersects the object image at location 454B with a real object 470 and an extension vector 472, then the motion parallax rendering of the object image shifts from being based upon the position and movement of the first observer to the position and movement of the second observer. FIG. 4B shows the first observer moving from position 400B to position 400C, which in this example corresponds to moving back to position 400A of FIG. 4A. The perceived location 454B of the object image is not shown to change for the second observer in FIG. 4B because motion parallax rendering of the object image is based upon the position and motion of the second observer, as indicated by the object image 454B of FIG. 4B having no internal hashing marks. However, the first observer does perceive the object image as changing from location 454 to location 454C in response to the motion and position of the first observer.

The input signal that caused the motion parallax rendering of the object to shift from the first observer to the second observer in FIG. 4A and FIG. 4B is shown as the extension vector 472 intersecting the object image at location 454B. In other examples, other inputs can cause the shift. For example, physical object itself 470, or the finger or other body part of the second observer could intersect the object image at location 454B. Alternately a command could be entered using a keyboard or mouse or other input device associated with the display. In another example, the shift can be based upon a facial recognition process. Facial recognition processes are known to those familiar with the art. The illustration shows the first observer having circular facial characteristics and the second observer having angular facial characteristics. An optical system can analyze the various facial characteristics to distinguish observers and either identify an observer or associate and observer with a database of known observers. If the appropriate privileges are associated with the second observer for accessing and or controlling processes associated with a system coupled to the display, then the motion parallax rendering of an object image can shift to the second observer based upon facial recognition. With an optical tracking system, both the position and movement and facial recognition of the observers can be processed. This can enable generation of the input signal for switching motion parallax rendering of an object from one observer to another observer. Furthermore, the optics of the tracking system can be used to process the images to determine positions, orientations and movements of observers and physical objects associated with the observers in addition to facial recognition. For example if one observer is a manger of a second observer, then motion parallax rendering may be shifted to the manager using such an approach, however a subordinate may not have the privileges to shift motion parallax rendering away from the manager with this approach.

Figure 5A:
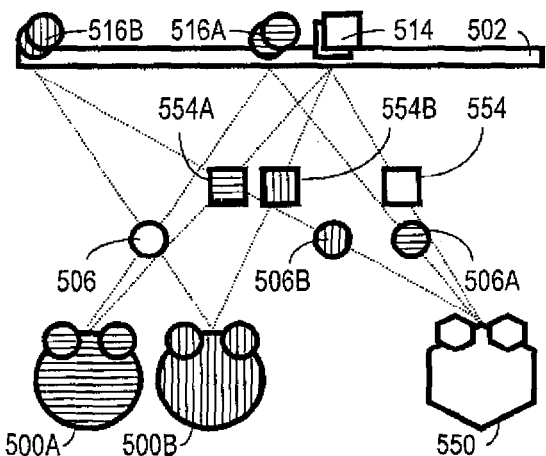
FIG. 5A and FIG. 5B illustrate an example of a motion parallax rendering of a first object image based upon a position of a first observer while also rendering a motion parallax rendering of a second object image based upon a position of a second observer.
Figure 5B:
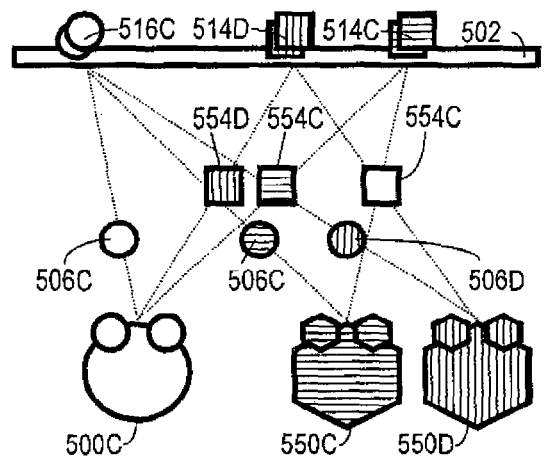

FIG. 5A and FIG. 5B illustrate an example of a motion parallax rendering of a first object image based upon a position of a first observer while also rendering a motion parallax rendering of a second object image based upon a position of a second observer. In FIG. 5A, the first object image is projected at location 506 as the first observer moves from position 500A to position 500B which results in first object image pairs to be rendered at 516A and 516B on display 502 in response. The second observer is at stationary position 550 and observes the first object image to be projected at locations 506A and 506B in response to the movement of the first observer. The second object image is second observer motion parallax projected at location 554 with stereoscopic image pair 514. The second observer is at stationary position 550 and observes the second object image to be projected at locations 554 independent of the movement of the first observer. As the first observer moves from position 500A to position 500B, the first observer views the second object image as appearing to move from location 554A to 554B in response, while the first object image appears stationary at location 506. The second observer views the second object image as appearing stationary at location 554, while the first object image appears to move from location 506A to 506B in response to the first observer movement and position.

In FIG. 5B, the second object image is projected at location 554C as the second observer moves from position 550C to position 550D which results in second object image pairs to be rendered at 514C and 514D on display 502. The first observer is at stationary position 500C and observes the second object image to be projected at locations 554C and 554D in response to the movement of the second observer. The first object image is first observer motion parallax projected at location 506C with stereoscopic image pair 516C. The first observer is at stationary position 500C and observes the first object image to be projected at location 506C independent of the movement of the second observer. As the second observer moves from position 550C to position 550D, the second observer views the first object image as appearing to move from location 506C to 506D in response, while the second object image appears stationary at location 554C. The first observer views the first object image as appearing stationary at location 506C, while the second object image appears to move from location 554C to 554D in response to the second observer movement between position 500C and 500D.

FIG. 5A and FIG. 5B show a display where some object images are motion parallax rendered for one observer and other object images are motion parallax rendered for another observer. Object images motion parallax rendered for an observer appear at a constant location relative to the display for the observer even though any observer may move positions. Object images not motion parallax rendered for the observer appear at change location relative to the display dependent upon motion and position of other observers. If an object image is associated with an observer, then motion parallax rendering the object based upon the observer is a natural indication that the object is associated with the observer because it appears at a relatively stationary location relative to the display.

Figure 6:
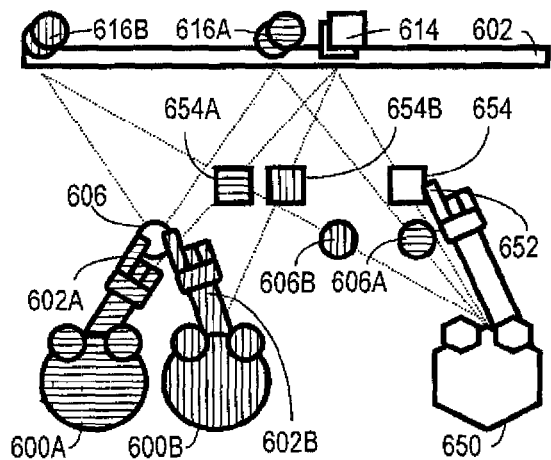
FIG. 6 illustrates an example of a first physical object intersecting a motion parallax rendering of a first object image based upon a moving position of a first observer while a second physical object intersects a motion parallax rendering of a second object image based upon a position of a stationary second observer.

FIG. 6 illustrates an example of a first physical object intersecting a motion parallax rendering of a first object image based upon a moving position of a first observer while a second physical object intersects a motion parallax rendering of a second object image based upon a position of a stationary second observer. In FIG. 6, the first object image is projected at location 606 as the first observer moves from position 600A to position 600B which results in first object image pairs to be rendered at 616A and 616B on display 602 in response. The second observer is at stationary position 650 and observes the first object image to be projected at locations 606A and 606B in response to the movement of the first observer. The second object image is second observer motion parallax projected at location 654 with stereoscopic image pair 614. The second observer is at stationary position 650 and observes the second object image to be projected at locations 654 independent of the movement of the first observer. As the first observer moves from position 600A to position 600B, the first observer views the second object image as appearing to move from location 654A to 654B in response, while the first object image appears stationary at location 606, and the second observer views the second object image as appearing stationary at location 654, while the first object image appears to move from location 606A to 606B in response to the first observer movement and position. The first physical object of the first observer is shown as a finger of the first observer. In first observer position 600A, finger 602A intersects the first object image located at 606 and then the first observer moves to position 600B, finger 602B intersects the first object image at the same location 606, even though the first observer has moved to a different position. The second physical object of the second observer 650 is shown as the finger 652 of the second observer, which is shown to intersect the second object image at location 654 independent of the position of the first observer. Thus, each observer observes a motion parallax rendered object in a constant location relative to the display independent of the motion of either observer. The intersection of the constant location with a physical object results in generation of a signal which enables subsequent processes.

Figure 7:
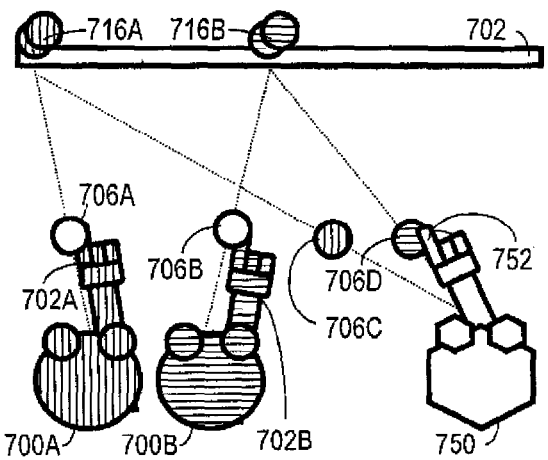
FIG. 7 illustrates an example of a motion parallax rendering of an object image rendered as if it is attached to a moving physical object of a first observer while being intersected by a physical object of a second observer.

FIG. 7 illustrates an example of a motion parallax rendering of an object image rendered as if it is attached to a moving physical object of a first observer while being intersected by a physical object of a second observer. First observer 700A controls a first physical object 702A which is shown as a finger of the first observer. An object image 706A is rendered with motion parallax with stereoscopic image pairs 716A on display 702 to appear as if the object image is attached to the finger of the first observer. The observer moves to position 700B and moves physical object finger to position 706B. The tracking system (not shown) determines the position of the observer 702B and the position of the first observer's finger 702B and renders stereoscopic image pair 716B on display 702 to project the first object image in a location 706B to correspond to the position of the finger based upon the position of the observer. Thus, the first object image appears to the first observer as if it is attached to the finger of the first observer. The second observer is in a stationary position 750 and perceives the first object at location 706C in response to the first observer having a position 700A and a finger at position at 702A. The second observer also perceives the first object at location 706D in response to the first observer having a position 700B and a finger at position 702B, and the physical object controlled by the second observer, shown as a finger of the second observer 752 is placed at location 706D to cause an intersection with the perceived location of the object image. An input signal is generated in response and a subsequent process may be enabled. One example of a subsequent process would be to render the object image as if it were attached to the finger of the second observer, thereby transferring motion parallax rendering of the object image based upon the second observer and second physical object, rather than the first observer and the first physical object.

Figure 8:
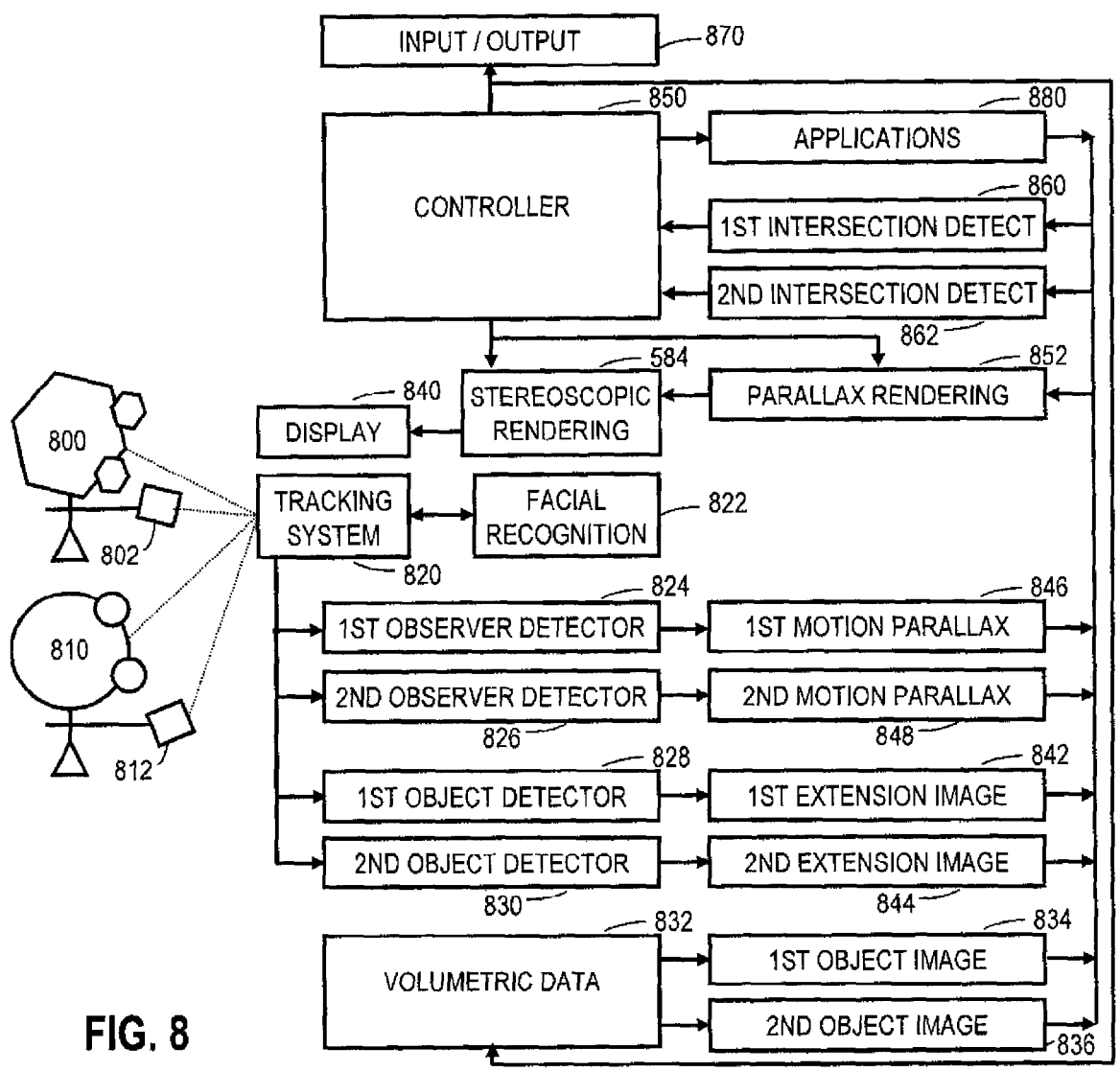
FIG. 8 illustrates an example of a block diagram of system implementing a multiple observer display with motion parallax.

FIG. 8 shows an example of a block diagram of system implementing a multiple observer display with motion parallax. Tracking system 820 receives information regarding a first observer 800 and a physical object 802 controlled by the first observer as well as a second observer 810 and a physical object 812 controlled by the second observer. Tracking system is able to produce image data including first observer image data and second observer image data allowing unique identification of the first and/or the second observers using facial recognition of other approach as well as the ability to determine the position of the first and second observers, and their motion by determining time-to-time changes in position. Identification of the observers also allows for association of object images with observers. Tracking system 820 may be any number of tracking systems known to those familiar with the art and may include one or more pairs of stereo cameras receiving light in the infrared, visible and/or ultraviolet spectrum in order to obtain images tracking multiple observers and multiple objects. In one example, the tracking may be simplified by placing fiducial dots approximate to the eyes of the observers and approximate to the physical object. The each fiducial dot may be highly reflective to light or a certain spectrum and the tracking system may include corresponding light radiators to illuminate the fiducial dots for the cameras. Such systems for detecting single observers and objects have been described in aforementioned U.S. Pat. No. 6,243,054 and implemented by zSpace and Leonardo 3D devices. In another example, the tracking system can radiate one or more array pattern of light and receive the pattern with one or more cameras in order to process the pattern to detect observers and physical objects. Such a system has been implemented by the Microsoft Kinect. Such systems may include a time of flight dimension to facilitate determining a distance of an observer or an object from the tracking system. Facial recognition processor 822 process images received by the tracking system to identify observers. Facial recognition processes are known to those familiar with the art. Once identified, privileges associated with the observers may be utilized.

The first observer detector 824 and the second observer detector 826 process the data from the tracking system to determine the position, orientation and motion of the first and second observers. The first physical object detector 828 and the second physical object detector 830 process the data from the tracking system to determine the position, orientation and motion of the first and second physical objects. Volumetric data 832 includes three dimensional data about objects to be rendered in a space about the display. Individual object images are determined from the volumetric data by first object imaging module 834 and second object imaging module 836. Upon displaying the data the objects are rendered with object images relative to the display 840, the first observer 800, the first physical object 802, the second observer 810 and the second physical object 812. The first extension image module 842 determines a first extension vector based upon the position, orientation and motion of the first physical object 802 (and a corresponding first extension image if appropriate) and the second extension image module 844 determines a second extension vector based upon the position, orientation and motion of the second physical object 812 (and a corresponding second extension image if appropriate).

The first motion parallax module 846 determines how to render a motion parallax view of object images associated with the first observer 800 based upon the position, motion and orientation of the first observer. Object images associated with the first observer can include the first extension image, the first object image and/or the second object image as appropriate. The second motion parallax module 848 determines how to render a motion parallax view of object images associated with the second observer 810 based upon the position, motion and orientation of the second observer. Object images associated with the second observer can include the second extension image, the first object image and/or the second object image as appropriate. Controller 850 controls the system and, among other things, determines which objects and corresponding object images and extension images are associated with the first and second observers. Controller 850 may include a computer and a non-transitory computer readable medium having a stored set of instructions that when executed cause the system to operate as described herein.

The parallax rendering module 852 receives information regarding the first object image from first object imaging module 834, the second object image from the second object image module 836, the first extension image from the first extension image module 842, the second extension image from the second extension image module 844, the first observer motion parallax for first observer motion parallax module 846 and the second observer motion parallax perspective from the second observer motion parallax module 848 to render images for the display 840. Stereoscopic rendering module 584 determines how to render left and right eye image pairs of the object images for a stereoscopic projection of the object images. It should be noted that in some examples of motion parallax, stereoscopic projection of the rendered image is not necessary and only a single left eye or right eye version of the image is rendered while displaying a motion parallax rendering. The stereoscopic (or non-stereoscopic single eye) image is rendered on display 840. Display 840 may project stereoscopic images in any manner known to those familiar with the art included polarizing or active shutter glasses system and glasses free systems including parallax projecting displays. Also, display 840 can be a non-stereoscopic display if single eye non-stereoscopic motion parallax renderings are to be displayed.

First intersection detector module 860 detects if an intersection has been indicated by an observer controlling a physical object and viewing the first object image. If the first object image is rendered with motion parallax based upon the first observer, then the location of the first object image perceived by the first observer will appear in a substantially constant location relative to the display, while the location of the first object image perceived by the second observer will be in a variable location depending on the position and movement of the first and second observers. If the first object image is rendered with motion parallax based upon the second observer, then the location of the first object image perceived by the second observer will be in a substantially constant location relative to the display, while the location of the first object image perceived by the first observer will be in a variable depending on the position and movement of the first and second observers. A first input signal is generated in response to the detection of the intersection. The first input signal can include an indication that the intersection was caused by a physical object controlled or operated by either the first or the second observer.

Second intersection detector module 862 detects if an intersection has been indicated by an observer controlling a physical object and viewing the second object image. If the second object image is rendered with motion parallax based upon the first observer, then the location of the second object image perceived by the first observer will appear in a substantially constant location relative to the display, while the location of the second object image perceived by the second observer will be in a variable location depending on the position and movement of the first and second observers. If the second object image is rendered with motion parallax based upon the second observer, then the location of the second object image perceived by the second observer will appear in a substantially constant location relative to the display, while the location of the second object image perceived by the first observer will be in a variable location depending on the position and movement of the first and second observers. A second input signal is generated in response to the detection of the intersection. The second input signal can include an indication that the intersection was caused by a physical object controlled or operated by either the first or the second observer.

Controller 850 receives the input signals and enables processes in response. In one example, an enabled process sends a signal to input/output 870 which may cause generation of an audio alert or may communicate the signal to another device to enable a further process such as turning off or on or otherwise controlling a piece of equipment. In another example, an enabled process can include launching an application 880 in the device, such as a word processing or email application or any of numerous other applications known to those familiar with the art. In another example the enabled process modifies the object in the volumetric data base 832, modifications include changing an objects size, position, velocity and direction (if the object is moving within the volumetric database) or other characteristic of the object. In another example, the enabled process can change the motion parallax perspective of the object image by changing the observer upon which the motion parallax of the object image is rendered.

Figure 9:
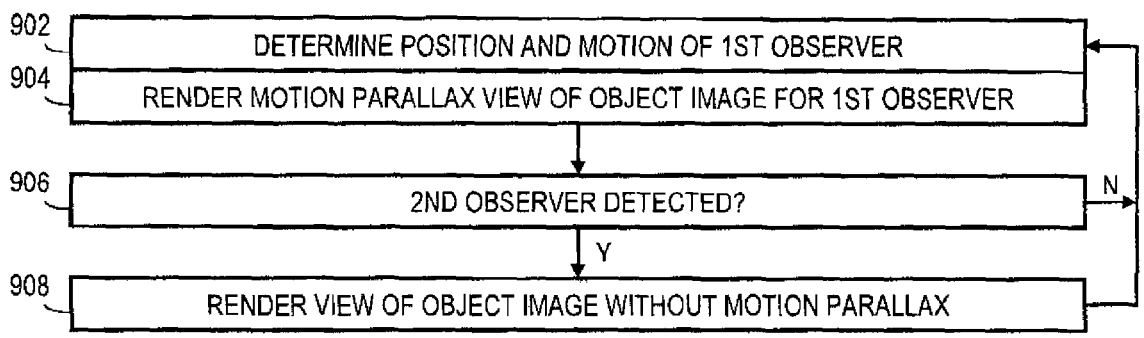
FIG. 9 illustrates an example flow diagram of motion parallax display rendered for a single observer.

FIG. 9 illustrates an example flow diagram of motion parallax display rendered for a single observer only. Step 902 determines the position and motion of a first observer and step 904 renders a motion parallax view of an object image based upon the first observer. If a second observer is detected at step 906, then step 908 renders the view of the object image without motion parallax. Thus, if more than one observer is detected, then the flow diagram terminates rendering of a motion parallax view of the object image. Note that in the flow diagram of FIG. 9 the object image may or may not be stereoscopically projected. In some applications, rendering of a motion parallax object image may be undesirable by the observer for which motion parallax is not based upon. Thus, rendering the object image without motion parallax may be a benefit when multiple observers are detected.

Figure 10:
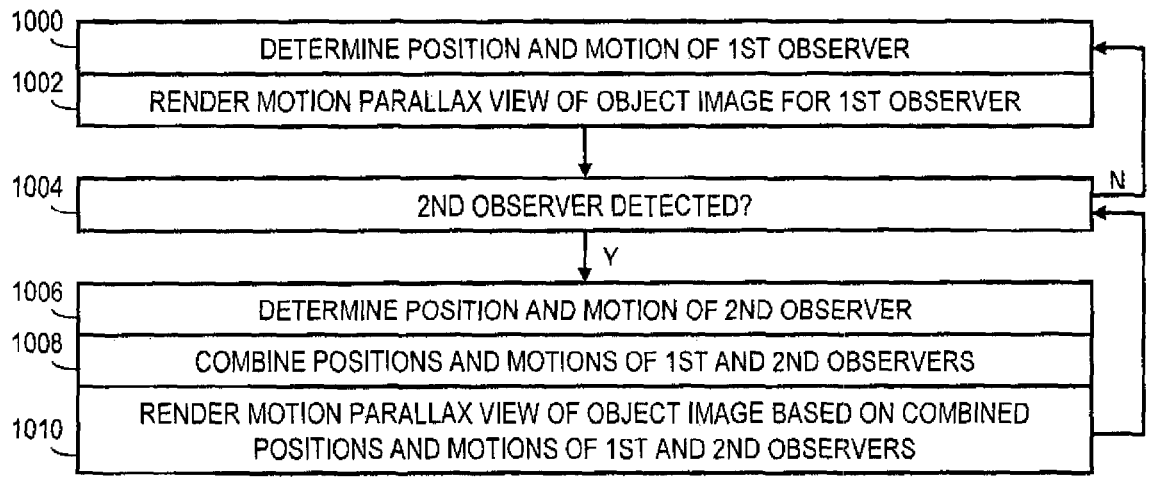
FIG. 10 illustrates an example flow diagram of the rendering of a motion parallax display in response to both first and second observers.

FIG. 10 illustrates an example flow diagram of the rendering of a motion parallax display in response to both first and second observers. Step 1000 determines the position of a first observer. Step 1002 renders a motion parallax view of an object image for the first observer. Step 1004 determines if a second observer is detected. If so, step 1006 determines the position and motion of the second observer and step 1008 combines the positions and motions of the first and second observers. Step 1010 renders a motion parallax view of the object image based upon the combined positions and motions of the first and second observers. The combination of the positions and motions of the first and second observers may result in the rendering of motion parallax from a third synthesized observer which in one example exhibits a position and motion of the average position and motion of the first and second observers. In another example, the position and motion of one observer may be given more weight than the other observer. For example, if one observer had recently caused a physical object to intersect a location of an object image, then that observer's position and movement may be given twice the weight of the other observer. If for example X, Y and Z represent Cartesian coordinates relative to a space in front of the display, and the position of observer one relative to the display is X1, Y1, Z1, and the position of the other observer is X2, Y2, Z2 and the position of the synthesized observer is X3, Y3 and Z3, then in the first example, X3=(X1+X2)/2, Y=(Y1+Y2)/2, Z3=(Z1+Z2)/2, while in the second example where one observer has a greater weight, then X3=(2*X1+X2)/3, Y3=(2*Y1+Y2)/3, Z3=(2*Z1+Z2)/3. In another example, a preferred observation position of X0, Y0, Z0, can be included in the determination where X3=(X0+X1+X2)/3, Y3=(Y0+Y1+Y2)/3, Z3=(Z0+Z1+Z2)/3 where the preferred observer position can correspond to a location with optimum stereoscopic viewing such as a position centered about the display with a preferred distance from the display, say eighteen inches for example.

Figure 11:
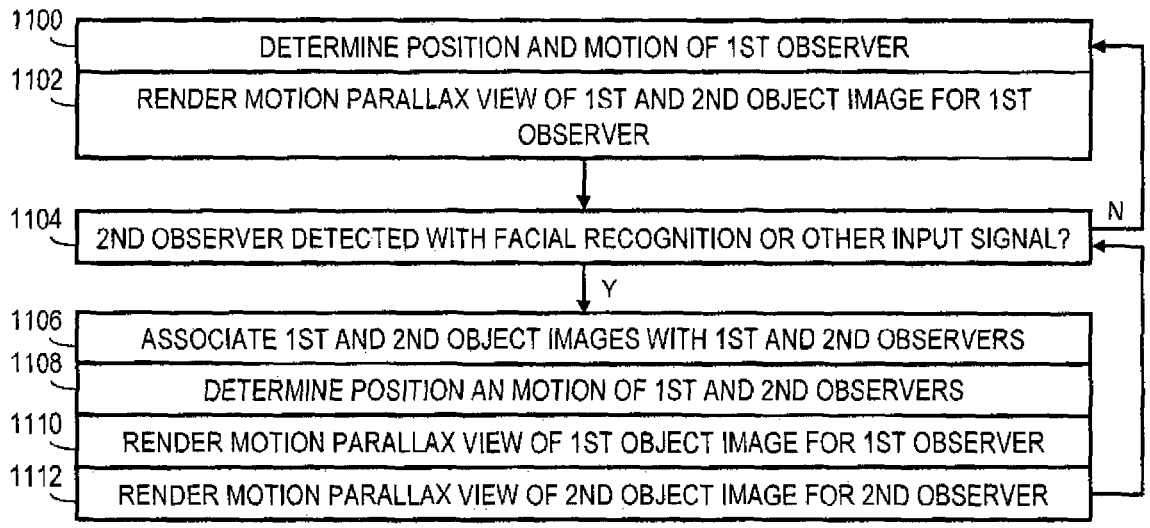
FIG. 11 illustrates and example flow diagram of the rendering of a multiple observer motion parallax display with multiple object images using facial recognition for associating an object with an observer.

FIG. 11 illustrates and example flow diagram of the rendering of a multiple observer motion parallax display with multiple object images using facial recognition for associating an object image with an observer. Step 1100 determines the position and motion of the first observer. Step 1102 renders a motion parallax view of a first object image and a second object image based upon the first observer. Step 1104 determines if a second observer has been detected with facial recognition, or identified with another input signal, as previously discussed. If so, step 1106 associates the first object image with the first observer and the second object image with the second observer. The association of the second object image with the second observer may be made based upon a predetermined linkage between second object image and the second observer in response to identification of the observer by either facial recognition or other input signal. Step 1108 determines the position and motion of both the first and second observers and step 1110 renders a motion parallax view of the first object image based upon the first observer and step 1112 renders a motion parallax view of the second object image based upon the second observer. FIG. 11 shows an example of associating multiple object images with multiple observers and rendering the object images with motion parallax based upon each associated observer. Building on this example, one set of object images, such as a menu of items can be associated with a first observer, wherein each item in the menu corresponds to a process enabling object image associated with the first observer while a second menu of items can be associated with the second observer. Each item menu associated with the corresponding observer will appear relatively stationary on the display for the associated observer, independent of the position and movement of either observer. This provides an enhanced user interface for both observers viewing the display.

Figure 12:
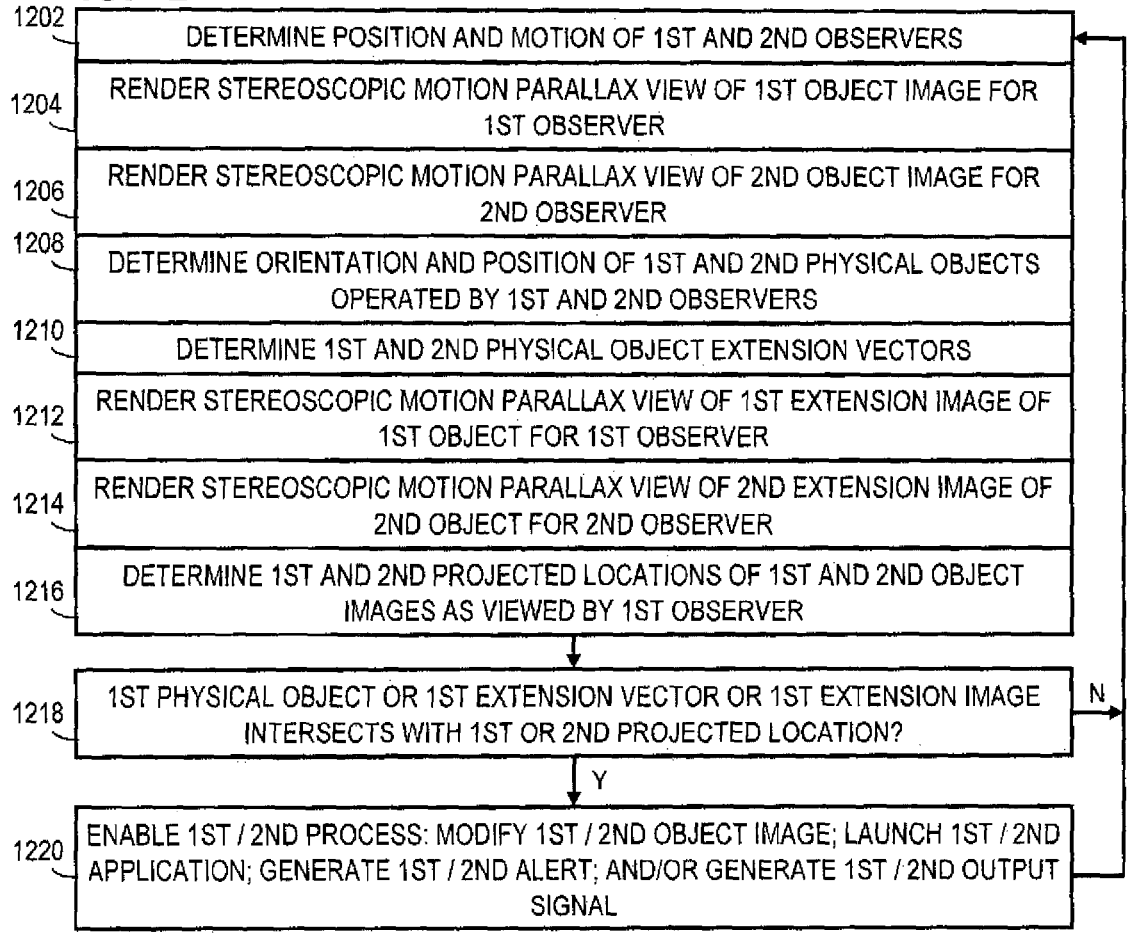
FIG. 12 illustrates and example flow diagram of the rendering of a multiple observer motion parallax display with multiple object images and multiple stereoscopic extension images.

FIG. 12 illustrates and example flow diagram of the rendering of a multiple observer motion parallax display with multiple object images and multiple stereoscopic extension images. Step 1202 determines the position and motion of first and second observers. Step 1204 renders a motion parallax view of the first object image based upon the first observer. Step 1206 renders a motion parallax view of the second object image based upon the second observer. Step 1208 determines the position and orientation of first and second physical objects operated by the first and second observers. Step 1210 determines the first and second extension vectors associated with the first and second physical objects and their positions, orientations and motions. Step 1212 renders a motion parallax view of the first stereoscopic extension image relative to the first object based upon the first observer. Step 1214 renders a motion parallax view of the second stereoscopic extension image relative to the second object based upon the second observer. Step 1216 determines the projected location of the first and second object images as viewed by the first observer. Step 1218 determines if either the first object, the first extension vector, or the first extension image intersects with either the first or second projected locations of the first or second object images based upon the first observer. If an intersection is detected, then an input signal is generated and any of a number of processes can be enabled. A first or second process can be enabled in response to an intersection with the first or second object image locations. Also, the first or second object images can be modified, a first or second application can be launched, a first or second audio signal can be generated or a first or second output signal can be generated. Also, if the intersection is with the location of the second object image, then the motion parallax view of the second object image can be rendered based upon the first observer in response to the first observer. It should be appreciated that although steps 1216-1220 are shown with respect to the first observer, a similar set of steps can be taken with respect to the second observer.

In modification, the parallax rendering of a physical object which is based upon observer can be a component in determining if an intersection caused by physical element or object is qualified to result in initiating of a subsequent process. In one example, only intersections caused by an observer upon which motion parallax is rendered for the object image will be a qualified intersection. Thus, only the observer for whom the object image appears stable can cause a qualified intersection with the object image. In examples with a multiplicity of observers, only a plurality of observers may cause a qualified intersection. The plurality of observers may be identified in response to facial recognition or the selective process.

Figure 13:
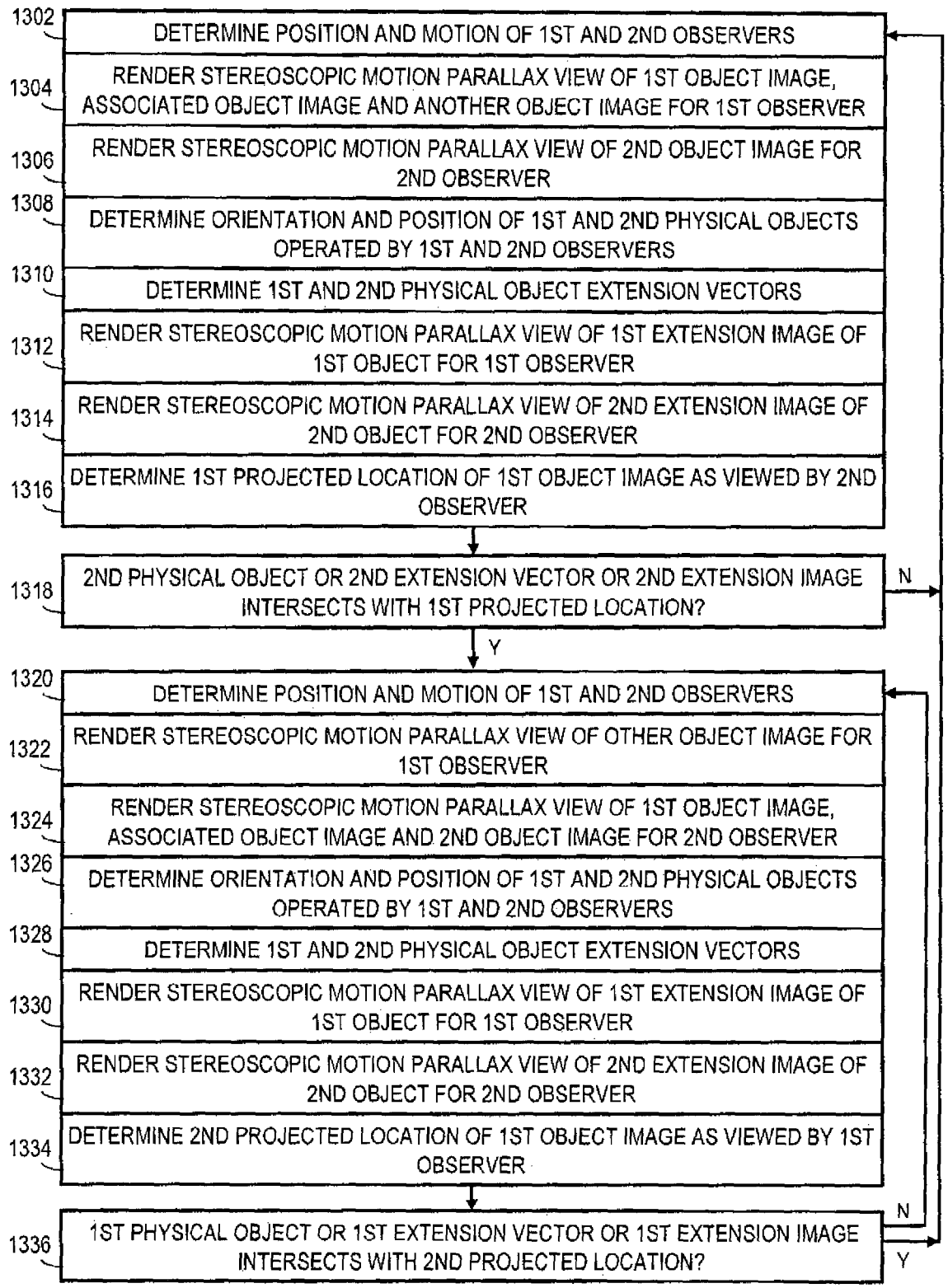
FIG. 13 illustrates and example flow diagram of the rendering of a multiple observer motion parallax display with multiple object images and multiple stereoscopic extension images where motion parallax rendering of multiple objects images transitions between observers.

FIG. 13 illustrates and example flow diagram of the rendering of a multiple observer motion parallax display with multiple object images and multiple stereoscopic extension images where motion parallax rendering of multiple objects images transitions between observers. Step 1302 determines the position and motion of the first and second observers. Step 1304 renders a motion parallax view of a first object image, an associated object image associated with the first object image, and another object image based upon the first observer. Step 1306 renders a stereoscopic motion parallax view of a second object image based upon the second observer. Step 1308 determines the position and orientation of first and second physical objects operated by first and second observers. Step 1310 determines first and second physical object extension vectors based upon the determined position and orientation of the physical objects. Step 1312 renders a stereoscopic motion parallax view of the first extension image of the first physical object based upon the first observer. Step 1314 renders a stereoscopic motion parallax view of the second extension image of the second physical object based upon the second observer. Step 1316 determines the first projected location of the first object image as viewed by the second observer. Step 1318 determines if the second physical object or the second extension vector or the second extension image intersects with the first projected location.

If so, step 1320 determines the position and motion of the first and second observers. Step 1322 renders a motion parallax view of the other object image based upon the first observer. Step 1324 renders a stereoscopic motion parallax view of the first object image, the associated object image associated with the first object image, and the second object image based upon the second observer. Thus the motion parallax view of the first object image and the associated object image are rendered based upon the second observer in response to an affirmative result of step 1318. Step 1326 determines the position and orientation of first and second physical object operated by first and second observers. Step 1328 determines first and second physical object extension vectors based upon the determined position and orientation of the physical objects. Step 1330 renders a stereoscopic motion parallax view of the first extension image of the first physical object based upon the first observer. Step 1332 renders a stereoscopic motion parallax view of the second extension image of the second physical object based upon the second observer. Step 1334 determines the projected location of the first object image as viewed by the first observer. Step 1336 determines if the first physical object or the first extension vector or the first extension image intersects with the first projected location. If so, then the flow diagram returns to step 1302 to render the first object image and associated image with a motion parallax view based upon the first observer, otherwise the flow diagram returns to step 1320 to render the first object image and associated image with a motion parallax view based upon the second observer.

One of the operations shown by FIG. 13 is that the motion parallax rendering of an object image and an associated object image can be transferred between observers. The transfer occurs in response to an observer causing an intersection with the object image. The object image and the associated object image may be included in a menu of items, where an intersection with each object image in the menu enables a corresponding process.

While the object images are shown in the figures as stationary, those familiar with the art will appreciate that the object images need not be stationary and may have a motion associated with them while remaining within the scope of the disclosure.

While the disclosure describes multiple viewer motion parallax system with respect to two observers, those familiar with the art will appreciate that the system may be extended beyond two observers, where each observer can have an object image rendered with motion parallax based upon the observer. Additionally, the system can determine a physical object based intersection with an object image based upon an observer position, when the object image is not rendered with motion parallax based upon the observer controlling the physical object.

The present subject matter can be realized in hardware, software, or a combination of hardware and software. A system can be realized in a centralized fashion in one computer system, or in a distributed fashion where different elements are spread across several interconnected computer systems. Any kind of computer system, or other apparatus adapted for carrying out the methods described herein, is suitable. A typical combination of hardware and software could be a general purpose computer system with a computer program that, when being loaded and executed, controls the computer system such that it carries out the methods described herein.

In a summary, the disclosure includes a method comprising: enabling a process to render on a display a first observer motion parallax view of an object image based upon a first observer, the rendered object image simultaneously viewable by the first observer and a second observer; and enabling the process to render on the display a second observer motion parallax view of the object image based upon the second observer and an input signal. The process renders the first observer motion parallax view based upon a position and a motion of the first observer and the process renders the second observer motion parallax view based upon a position and a motion of the second observer. The method further comprising: receiving a second observer image of the second observer; recognizing a distinguishing element in the second observer image indicative of the second observer; and generating the input signal based upon the recognizing. The method further comprising determining a position of the second observer based upon the second observer image wherein the process renders the second observer motion parallax view based upon the position of the second observer. The method further comprising: determining a position and a motion of the second observer while the process is enabled to render the first observer motion parallax view of the object image; and determining a position and a motion of the first observer while the process is enabled to render the second observer motion parallax view of the object image. The object image is a stereoscopic projection in a space relative to the display and rendering of the first observer motion parallax view results in a substantially constant location projection of the object image in the space relative to the first observer based upon the motion of the first observer and a variable location projection of the object image in the space relative to the second observer based upon the motion of the first observer, and the method further comprises: enabling a physical object to be observable by the second observer in the space in addition to the object image; determining the physical object indicating an intersection with the variable location projection of the object image; and generating the input signal based upon the determining of the intersection. The generating further comprises generating the input signal based upon a determination of the physical object being operated by the second observer. The method further comprising: determining a position and an orientation of the physical object; and determining an extension vector of the physical object based upon the determined position and orientation of the physical object, wherein the determining the physical object indicating the intersection with variable location projection of the object image further includes determining an intersection of the extension vector with the variable location projection of the object image. The enabling the process to render the first observer motion parallax view of the object image based upon the first observer includes enabling the process to render on the display a second observer motion parallax view of a stereoscopic extension image based upon the second observer and the extension vector. The enabling the process to render the first observer motion parallax view of the object image based upon the first observer also enables the process to render on the display a first observer motion parallax view of a second object image based upon the first observer; and the enabling the process to render on the display the second observer motion parallax view of the object image based upon the second observer and the input signal also enables the process to render on the display the first observer motion parallax view of the second object image based upon the first observer. The method further comprising: the enabling the process to render on the display the first observer motion parallax view of the object image based upon the first observer, also enables the process to render on the display a first observer motion parallax view of a second object image based upon the first observer; and the enabling the process to render on the display the second observer motion parallax view of the object image based upon the second observer and the input signal also enables the process to render on the display a second observer motion parallax view of the second object image based upon the second observer.

In a summary, the disclosure also includes a method comprising: rendering a first observer motion parallax view of a first object image on a display based upon a first observer; and rendering a second observer motion parallax view of a second object image on the display based upon a second observer also able to view rendering of the first observer motion parallax rendering of the first object image on the display based upon the first observer. The method further comprising: receiving image data including first observer image data and second observer image data; determining a position of the first observer based upon the first observer image data; uniquely identifying the first observer based upon the first observer image data; and associating the first object image with the first observer based upon the uniquely identifying the first observer; wherein the first observer motion parallax view is rendered based upon the associating the first object image with the first observer and the determining the position of the first observer. The method further comprising: determining a position of the second observer based upon the second observer image data; uniquely identifying the second observer based upon the second observer image data; and associating the second object image with the second observer based upon the uniquely identifying the second observer, wherein the second observer motion parallax view is rendered based upon the associating the second object image with the second observer and the determining the position of the second observer. The method further comprising: determining a position and a motion of the first observer; and determining a position and a motion of the second observer, wherein the first observer motion parallax view is rendered based upon the first observer position and motion, and the second observer motion parallax view is rendered based upon the second observer position and motion. The first object image is a stereoscopic projection in a space relative to the display and the first observer motion parallax rendering results in a substantially constant first location projection of the first object image in the space relative to the first observer based upon the motion of the first observer and a variable location projection of the first object image in the space relative to the second observer based upon the motion of the first observer, and the method further comprises: enabling a first physical object to be observable by the first observer in the space in addition to the first object image and the second object image; determining the first physical object indicating a first intersection with the first location projection of the first object image; and enabling a first process based upon the determining the first intersection. The second object image is a stereoscopic projection in the space and the second observer motion parallax rendering results in a substantially constant second location projection of the second object image in the space relative to the second observer based upon the motion of the second observer and a variable location projection of the second object image in the space relative to the first observer based upon the motion of the second observer, and the method further comprises: enabling a second physical object to be observable by the second observer in the space in addition to the first object image and the second object image; determining the second physical object indicating a second intersection with the second location projection of the second object image; and enabling a second process based upon the determining the second intersection. The second object image is a stereoscopic projection in the space and the second observer motion parallax rendering results in a substantially constant second location projection of the second object image in the space relative to the second observer based upon the motion of the second observer and a variable location projection of the second object image in the space relative to the first observer based upon the motion of the second observer, and the method further comprises: determining the first physical object indicating a second intersection with the variable location projection of the second object image; and enabling a second process based upon the determining the second intersection.

In a summary, the disclosure also includes a method comprising: detecting a presence of a first observer and an absence of a second observer; enabling a process to render on a display a first observer motion parallax view of an object image based upon the first observer; detecting the presence of the first observer and a presence of the second observer able to view the object image rendered on the display; and enabling the process to render on the display the object image without the first observer motion parallax view based upon and the detecting the presence of the first observer and presence of the second observer. The method further comprising: determining a position and a motion of the first observer; determining a position and a motion of the second observer; and enabling the process to render on the display a combined first and second observer motion parallax view of the object image based upon the determined first observer position and motion and the determined second observer position and motion. The enabling the process to render on the display the object image without the first observer motion parallax view based upon and the detecting the presence of the first observer and presence of the second observer further comprises enabling the process to render on the display a second observer motion parallax view of the object image based upon the second observer and an input signal. The method further comprising: receiving image data including second observer image data; uniquely identifying the second observer based upon the second observer image data; and generating the input signal in response to the uniquely identifying the second observer.

In a summary, the disclosure also includes a method comprising: enabling a process to render on a display a first observer motion parallax view of a first extension image based upon a first physical object and a first observer; and enabling the process to render on the display a second observer motion parallax view of a second extension image based upon a second physical object and a second observer. The method further comprising: determining a position of the first physical object; determining a position of the second physical object; determining a position of the first observer; and determining a position of the second observer, wherein the rendering on the display of the first observer motion parallax view of the first extension image is based upon the determined position of the first physical object and the determined position of the first observer; and the rendering on the display of the second extension image of the second object with the second observer motion parallax view is based upon the determined position of the second object and the determined position of the second observer. The method further comprising: enabling the process to render on the display a first observer motion parallax view of a third object image based upon the first observer; and enabling the process to render on the display a second observer motion parallax view of the third object image based upon the second observer and an input signal. The third object image is a stereoscopic projection in a space relative to the display and the rendering the first observer motion parallax view results in a substantially constant location projection of the third object image in the space relative to the first observer based upon the first observer and a variable location projection of the third object image in the space relative to the second observer based upon the position of the first observer, and the method further comprises: enabling a physical object to be observable by the second observer in the space in addition to the third object image; determining the physical object indicating an intersection with the variable location projection of the third object image; and generating the input signal based upon the determining the intersection.

In a summary, the disclosure also includes an apparatus comprising: a tracking system for tracking a position of a first observer and a second observer; and a parallax rendering module for rendering a motion parallax view of an object image on a display, the object image viewable by the first observer and the second observer, the motion parallax view of the object image based upon the first observer and the second observer. The apparatus further comprising: a first motion parallax rendering module for rendering the motion parallax view of the object image based on the first observer;

and a second motion parallax rendering module for rendering the motion parallax view of the object image based on the second observer, wherein the parallax rendering module renders the motion parallax view of the object image based on the first observer and renders the motion parallax view of the object image based on the second observer and an input signal. The tracking system generates image data including second observer image data, and the apparatus further comprises a facial recognition module for identifying the second observer based on the second observer image data and the input signal is generated based on the identification.

In a summary, the disclosure also includes an abstract summary where a display system renders a motion parallax view of object images based upon multiple observers. The motion parallax view of certain object images may be rendered based upon the position and motion of a first observer and the motion parallax view of other object images may be rendered based upon the position and motion of a second observer. An object image rendered with motion parallax based upon a first observer may be intersected by a physical object operated by the second observer at a location perceived by the second observer. Thereafter, the object image may be rendered with motion parallax based upon the second observer.

II. Augmentation of a Virtual Reality Object

Turning now to augmentation of a virtual reality object. The description further addresses a system wherein an observer is wearing a headset able to detect and interact with object images in a stereoscopic projection by a display separate from the headset.

Figure 14:
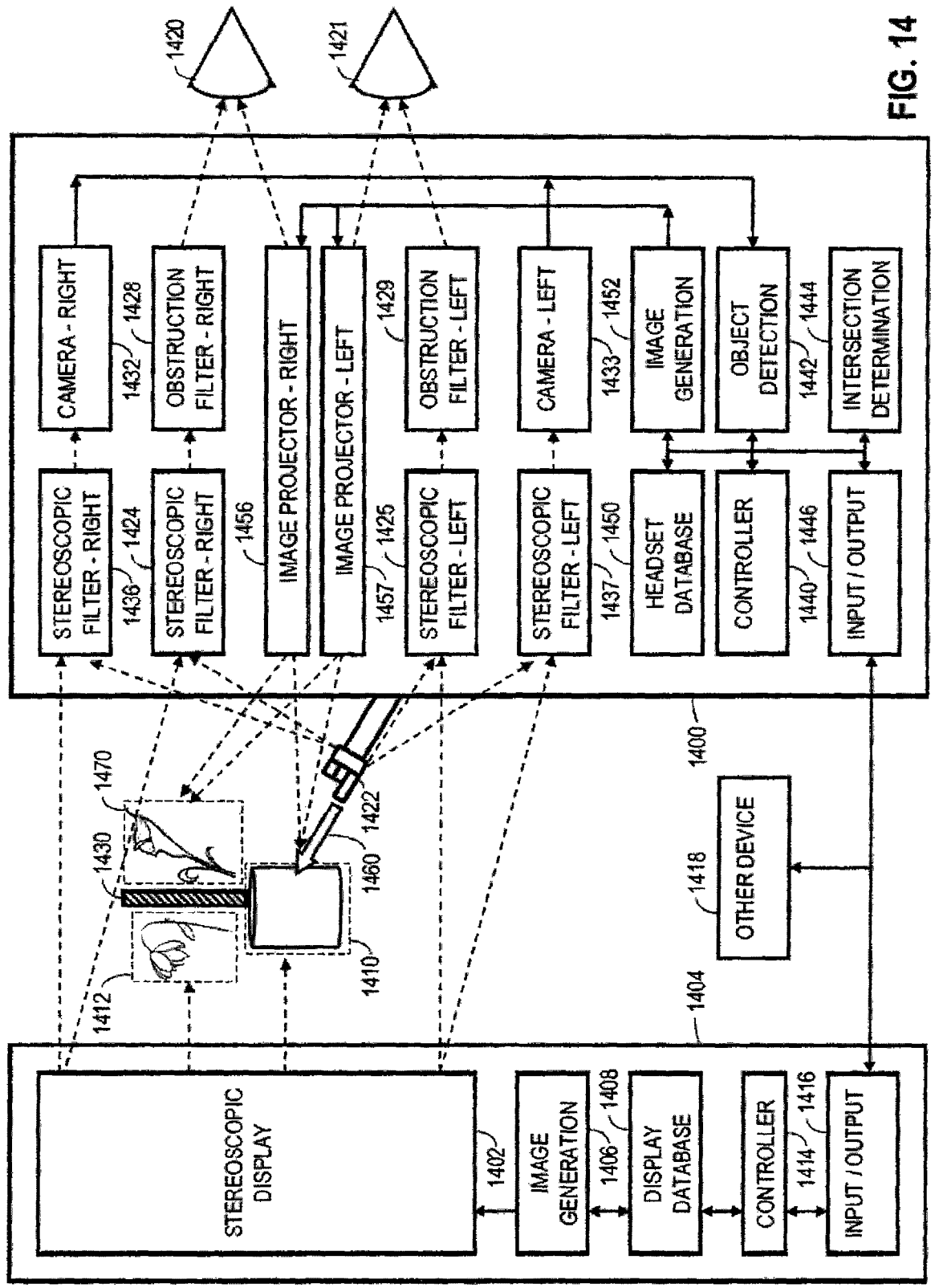
FIG. 14 illustrates an example block diagram of a system for augmentation of a virtual reality object.

FIG. 14 illustrates an example block diagram of a system for augmentation of a virtual reality object. Headset 1400 may be worn by an observer able to view a stereoscopic display 1402 included within a stereoscopic display system 1404 which may correspond to a motion parallax enabled product such as Learndo 3D, zSpace, and EON Reality's Ibench and Imobile devices or devices 102, 202, 302, 402, 502, 602 and 840, of the prior figures, or may correspond to a stereoscopic television or movie or other three dimensional projection system. The stereoscopic display may use any technology able to generate a three dimensional images including technologies known to those familiar with the art such as a polarized or active shutter technology that utilized a headset, or autostereoscopy or holograms which requires no headset. Stereoscopic images projected by display 1402 are generated by an image generator 1406 which formats the image for the stereoscopic projection on the display, the image may be generated from a display database 1408 which includes volumetric data indicative of one or more object images to be displayed within the stereoscopic image. An example of object images stored within display database 1408 includes a flower vase 1410 or a wilted daisy flower 1412. The stereoscopic image and object image are controlled by controller 1414 which may utilize input/output module 1416 to communicate signals with other devices 1418. Other devices 1418 may include any of a number of devices able to communicate with device 1402 such as Blu-ray movie player, other devices similar to device 1402, other internet connected or networked devices, and headset 1400. The connection may be any form of wired or wireless interface including POTS, HDMI, DVI, Display Port, Ethernet, Internet, Intranet, WiFi, Bluetooth, WiMAX, and LTE.

In order to perceive a stereoscopic image, the right eye 1420 of an observer receives a right image from display 1402 and the left eye 1421 of the observer receives a left image from display 1402. In response, a three dimensional virtual reality object image projected by the display is perceived by the observer. In the case of an autostereoscopic display, the display 1402 routs left and right images to the left and right eyes of the observer with any of a number of techniques including a lenticular lens, micro lens, and parallax barrier. Other forms of stereoscopic projection require a filter at the headset to filter left and right images for each eye. Such filtering systems known to those familiar with the art include active shutter and polarized filter systems. Right and left stereoscopic filters, 1424 and 1425, filter the right and left images projected by display 1402 for the right and left eyes, 1420 and 1421, of the observer. Right and left obstruction filters 1428 and 1429 are able to obstruct portions of real and stereoscopic images to enhance the images viewed by the observer through the headset. Examples of obstruction filters may be found in sunglasses made by Dynamic Eye and U.S. Pat. No. 6,559,813.

Right and left cameras 1432 and 1433 are positioned to receive approximately the same images received by the right and left eyes 1420 and 1421 of the observer. Right and left stereoscopic filters, 1436 and 1437, filter the images from the display before being received by the cameras for enabling the camera system to interpret stereoscopic projections by display 1402. Right and left stereoscopic filter 1424 and 1425 for the eyes of the observer may be the same filter element used for stereoscopic filters 1436 and 1437 for the cameras of the headset, or may be separate elements. Also note that active shutter and polarized filters enable the observer to view both stereoscopic projections of objects images projected by the display along with physical objects, such as the hand or finger 1422 of the observer, handheld pointer or wand, or other physical object. In the example of an autostereoscopic display, the stereoscopic filters may be eliminated from the headset.

The operation of the headset is controlled by controller 1440, which may include a computer executing program instructions such as a computer program product comprising a storage medium readable by a processing circuit and storing instructions for execution by the processing circuit for performing methods described herein. Controller 1440 may also include a non-transitory computer readable media having a stored set of instructions that when executed by a processor or computer cause the device to implement at least a portion of the methods or processes described herein. The controller coordinates and controls the processes and methods of the modules.

Object detector 1442 receives the right and left images from right and left cameras and recognizes objects within the images. The objects may include an object image 1410, such as a stereoscopic projection of a vase included within the stereoscopic image projected by the display 1402 or a physical object such as the hand or finger 1422 of the observer. Any recognition technique may be used while remaining within the scope of the description. For example, the physical object may include fiducial markers to facilitate recognition and the markers may be further illuminated with an infrared light source in a technique known to those familiar with the art. In another example, a different approach may be used to determine the location of the physical object rather than stereoscopic cameras 1428 and 1429, such as a system realized by the Microsoft Kinect mounted to the headset other optical, radio frequency acoustic receiver or transceiver as well as electromechanical sensor system associated with the observer, while remaining within the scope of this description. The obstruction filters 1428 and 1429 are shown to be producing an obstruction area 1430 at a location which is in substantial coincidence with the object image 1412 of the wilted daisy, thereby obstructing the view of the wilted daisy from the observer, while allowing the observer to view the vase object image 1410 projected by stereoscopic display 1402.

Virtual fiducial marks may be included in the object image to facilitate recognition. For example, yellow fiducial dots rendered on the vase 1410 may be recognized by their specific color, or may implement a unique right eye, left eye modulation or encoding able to be detected by the headset object detector. For example, the yellow be rendered as a red mark for the right eye image and a green mark for the left eye image. The observer would perceive a yellow dot while the object detector would receive two different color dots in each image. The difference in colors can be analyzed as a fiducial marker in a stereoscopic image by the object detector. Furthermore, the color differential encoding can be modulated between the eye images to facilitate the fiducial marks in the stereoscopic image. For example a yellow dot as perceived by an observer may actually be encoded as a right eye image which is green fifty percent of the time and red fifty percent of the time, while the left eye image is conversely red fifty percent of the time and green fifty percent of the time. The frequency of modulation may be once per video frame of the stereoscopic display or less often.

Intersection determiner 1444 determines if the physical object indicates an intersection with the object image projected by the display 1402. If an intersection is detected, then a signal is generated that may initiate or modify a process operating in the headset or other device. The modified process in the headset may include sending a signal indicative of the intersection to another device. Communication with another device may be accomplished through input/output module 1446 which may interface with other devices including other device 1418 or stereoscopic display system 1404 through input/output module 1416, which may be functionally similar to input/output module 1446 in the headset. The intersection may be determined if the physical object 1442 occupies substantially the same location as object image 1410, for example, from the perspective similar to the perspective of the observer. The perspective of the stereoscopic cameras 1432 and 1433 may be similar to the perspective of the eyes 1420 and 1421 of the observer, and compensation may be made to account for a predetermined geometric distance differences between perspectives. For example the cameras may be offset by a fraction of an inch above the eyes of the observer when the headset is worn by the observer. The offset may be compensated for modules of the headset processing cameral images and projection augmentation images. The headset may also be able to monitor the eyes of the observer to determine the location of the eyes relative to the headset and based thereupon, determine the offset (and also determine the direction of gaze of the observer for other interface purposes). The headset may also determine that the physical object is indicating an intersection with the object image. For example, the hand of the observer 1422 is shown pointing to the object image 1410, thereby indicating an intersection with the object image.

The headset also has a headset database 1450 having a volumetric data or other representation of three dimensional objects to be displayed to the observer. The object is converted to a stereoscopic image by image generator 1452 and projected into the eyes of the observer by right and left image projectors 1456 and 1457 in a manner known to those familiar with the art. Any manner of projecting a stereoscopic image from a headset worn by an observer into the eyes of an observer are included within the scope of this description. FIG. 14 shows headset projectors projecting two stereoscopic images, a first stereoscopic image corresponding to a stereoscopic extension image 1460 of an arrow or laser beam extending from a physical object 1422, the finger of the observer. A second stereoscopic extension image 1470 projected by right and left projectors 1456 and 1457 is shown as an image of a healthy calla lily flower located in substantial coincidence with obstruction area 1430.

FIG. 14 illustrates a stereoscopic display system 1404 rendering two object images, a vase 1410 and a wilted daisy flower 1412. The headset 1400 enables the observer to observe the two object images 1410 and 1412 while simultaneously viewing a physical object 1422, which in this example is the hand of the observer. Active shutter or polarized stereoscopic filters 1424 and 1425 allow the observer to perceive a three dimensional view of the object images as well as the three dimensional view of observer's hand, the image of which is passed by the stereoscopic filters in a way that is substantially unmodified from the perspective of the observer. The camera system 1432 and 1433, through stereoscopic filters 1436 and 1437 enable object detector 1442 to determine locations of the object images 1410 and 1412 relative to the headset as well as the location, orientation and position of physical object 1422. The headset also has obstruction filters which in this example are creating an obstruction area 1430 in substantial coincidence with wilted daisy object image 1412. Image projectors are also shown projecting a stereoscopic image 1470 of a healthy calla lily in substantial coincidence with the obstruction area 1430. Thus, while the stereoscopic display system 1404 is projecting object images of a wilted daisy in a flower vase, the headset 1400 is augmenting the projected image by projecting an image of a health calla lily flower in the flower vase while further obstructing the image of the wilted daisy projected by the stereoscopic display. Thus, a virtual reality object image is projected by a stereoscopic display from a first display database, which is then augmented by the headset with a stereoscopic image from a second headset database, the augmented image not being included in the first database. The headset further augments the observer's view of a physical object, by adding a stereoscopic extension image of an arrow or laser beam emanating from the finger of the observer.

Furthermore, by the observer is pointing to the vase with a physical object. The headset is determining that the physical object is indicating an intersection with the object image. A corresponding process may be implemented as a result of the intersection. In one example of an implemented process, the stereoscopic extension image 1460 may be modified by the controller of the headset. If the extension image is a laser beam having a longer or even infinite perspective length, then its length could be shortened to the length of the vase when intersecting. Also, pointing to the vase could indicate to the controller that a new application should be enabled wherein the wilted daisy object image is be obstructed and a stereoscopic image of a healthy calla lily render in its place, thereby augmenting the image of the vases in response to the observer pointing to the vases. In another example, information regarding the intersection can be communicated to the stereoscopic display system 1404 through input/output modules 1416 and 1446, in response to which, the stereoscopic display system could modify the image of the vase in response thereto. The modification can include moving the rendered location of the vase, terminating the rendering of the vase or rendering a different object image instead of the vase by the stereoscopic display system.

In another example, the intersection can be communicated to another device 1418. For example, if stereoscopic display 1404 was a sign advertising the vase, then the observer pointing to the vase can be part of a sequence for purchasing the vase, where the purchase is communicated to another device, such as a server for eBay or Amazon, through the Internet. In this example, the headset need not communicate with the sign having display 1402 for projecting the vase, thereby facilitating the transaction without the expense of a designing and installing sign able to communicate with the headset.

In another example, stereoscopic image 1460 need not be an extension of the physical object and may have a location determined by other processes in the headset. Such an example may be a traveling tennis ball rendered by the headset on a path determined by the controller of the headset. The headset object detector can also detect the intersection between the stereoscopic image rendered by the headset and an object image projected by the stereoscopic display. To build on the example, the object image may be a tennis racket project by the display. This intersection is determined to occur at a location where no physical object exists, only the virtual image projected by the display and the stereoscopic image rendered by the headset. A response to the intersection can correspond to other intersection responses including those described herein. In this example, the response to the intersection may be to modify the path of the tennis ball in response to the intersection and to generate a sound at the headset similar to the sound of a tennis ball intersecting a tennis racket.

Figure 15:
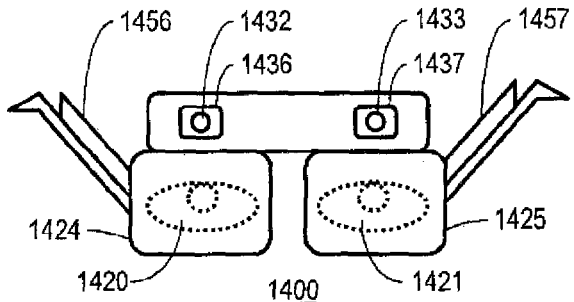
FIG. 15 illustrates an example illustration of a headset worn by an observer.

FIG. 15 illustrates an example illustration of a headset worn by an observer. Headset 1400 has right and left stereoscopic filters 1424, 1425 that filter the object images projected by the stereoscopic display for the right and left eyes 1420, 1421 of the observer while allowing physical objects to also be viewed by the observer wearing the headset. Right and left stereoscopic filters 1436, 1437 filter the object images rendered by the stereoscopic display for the right and left cameras 1432, 1433 of the headset to allow for determination of the location of the object images and physical objects and any intersection indication.

Figures 16A, 16B:
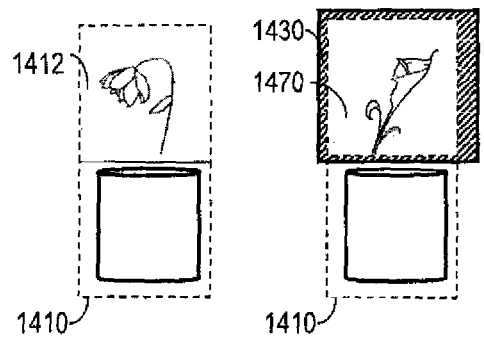
FIG. 16A and FIG. 16B illustrate an example of images viewed by an observer of a stereoscopic projection display without and with the headset of the disclosure.

FIG. 16A and FIG. 16B illustrate an example of images viewed by an observer of a stereoscopic projection display without and with the headset of the disclosure. In FIG. 16A, the observer with a standard stereoscopic headset, such as an active shutter headset or a polarized headset, or no headset in the event of a autostereoscopic display, sees a vase 1410 with a wilted daisy flower 1412 projected by the display. In FIG. 16B, the observer wearing headset 1400 sees vase 1410 with a healthy calla lily 1470. The object image of the wilted flower is received by left and right cameras 1432, 1433, detected by object detector 1442. As previously discussed, fiducial markers may be imbedded in the object image 1412 to facilitate detection by the object detector. The fiducial markers may be visible to the observer or hidden in the image. For example, for one fiducial, if the left most pedal of the daisy is yellow, it may appear red in the right eye image and green in the left eye image, wherein the left and right eye images are perceived as yellow by the observer, but perceived as markers indicative of a fiducial by the object detector. Controller 1440 causes left and right obstruction filters 1428, 1429 to generate an obstruction area 1430 that obstructs the object image of the wilted daisy 1412 from the observer. Controller 1440 also causes image generator 1452 to generate an image from the headset database 1450 of the health calla lily and render a stereoscopic image with left and right image projectors 1456, 1457 of the healthy calla lily 1470 in substantial coincidence with the obstruction area 1430. Thus the observer wearing the headset 1400 sees a vase 1410 augmented with a healthy calla lily 1470 instead of the wilted daisy projected by the display. Other examples of augmentation by the headset need not include the obstruction filter. Furthermore, the augmentation of the object image may extend beyond the display area of the stereoscopic display 1402, thereby providing for an augmentation of a virtual reality object or image that exceeds the display area of the display projecting the virtual reality object or image. For example, the calla lily stereoscopic image 1470 may be considerably larger than wilted daisy image 1412 and extend beyond the boundaries of display 1402. This type of extended augmentation is an enhancement over systems utilizing only display 1402.

FIG. 14 also shows that the headset 1400 is able to simultaneously render augmentation images of both physical objects and object images projected by a stereoscopic display. The stereoscopic image of the calla lily flower 1470 augments the object image 1410 projected by stereoscopic display 1402, and stereoscopic extension image 1460 augments physical object 1422, the hand or finger of the observer.

FIG. 17A-FIG. 17D illustrate examples of augmentation of a virtual reality object image. In FIG. 17A, a virtual reality object image 1700 appears as a candle having a wick which is projected by a stereoscopic display 1402. A physical object 1422 is shown as being augmented by a stereoscopic image 1710 rendered by the headset. In this example the stereoscopic image is a flame which is shown as augmenting a physical object observable by the observer corresponding to the finger of the observer. FIG. 17B shows the observer's finger has been moved to intersect with the wick of the candle projected by the display. The observer's image remains augmented by the flame rendered by the headset. The object detector 1442 determines the location of the wick relative to the headset and the finger by processing images from the left and right cameras 1432, 1433, and intersection determiner 1444 determines the intersection between the wick and the finger and a process is initiated or modified in response to the intersection.

FIG. 17C illustrates the process initiated by the intersection as rendering a stereoscopic image 1712 of a flame by the headset that augments the object image 1700 of the candle and wick projected by the display. Note that in the example of FIG. 17C, the stereoscopic image 1710 of the flame is retrieved from headset database 1450, and need not be included in stereoscopic projection system's display database 1408. Similarly, the object image of the candle and wick are retrieved from the display database, 1408 and need not be included in the headset database 1450. Thus, the observer of FIG. 17C perceives a stereoscopic image of a candle with a flame when neither the headset nor the stereoscopic projection system has a database with the complete image of a candle and a flame.

FIG. 17D illustrates an alternate example. The intersection detected in FIG. 17B results in a process that sends a signal from the headset 1400 to the stereoscopic projection system 1404 indicative of the intersection. In this example, in response to receiving the intersection signal, an object image 1720 of a flame is retrieved from the display database 1408 and projected in coincidence with the wick of the candle of the object image 1700 by stereoscopic display 1402. The headset continues to render a stereoscopic image 1710 of a flame on the physical object 1422, the finger of the observer. Note that since flame 1710 is retrieved from the headset database 1450 and flame 1720 is retrieved from display database 1408, they may not have an identical appearance. Indeed flame 1710 and flame 1720 are shown as having different appearances. In another example the headset 1400 and display system 1404 may exchange data through input/output modules 1416, 1446 related to flame images 1710 and 1720 to provide a uniform appearance to the observer.

Figure 18:
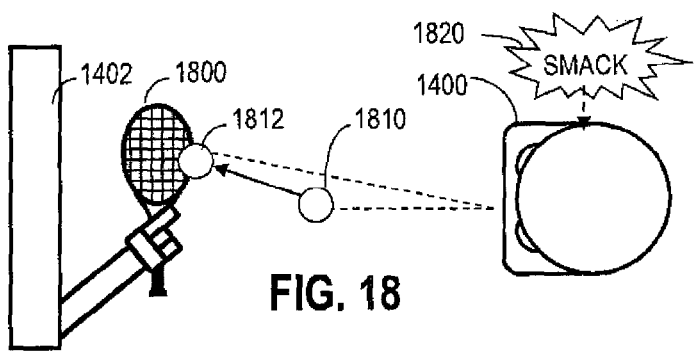
FIG. 18 illustrates an example of an intersection between an object image projected by a stereoscopic display and a stereoscopic image rendered by a headset.

FIG. 18 illustrates an example of an intersection between an object image projected by a stereoscopic display and a stereoscopic image rendered by a headset. Stereoscopic display 1402 is projecting object image 1800 shown as a handheld tennis racket. Headset 1400 is rendering a stereoscopic image 1810, 1812 of a tennis ball in flight. In this example, right and left cameras 1432, 1433 receive right and left images of the object image, which are processed to determine the location of the object image relative to the headset. The controller 1440 causes an image of a tennis ball from headset database 1450 to be processed by image generator 1452 and rendered by right and left image projectors 1456, 1457 to move along a path as shown by 1810 and 1812. The intersection determiner 1444 determines the location of the tennis racket object image relative to the headset and determines if the location of the stereoscopic tennis ball rendered by the headset intersects with the determined location of the object image. If the tennis ball intersects the tennis racket, as shown by stereoscopic image 1812 being in substantial coincidence with object image 1800, and in response a process is enabled. In this example, the headset enables a process that generates a sound 1820 in response to the intersection. In this example, the headset includes one or more speakers allowing the observer to hear sounds generated by the headset. In this example, the sound generated by the headset in response to the intersection is a "smack" sound corresponding to the sound created by an intersection between a real physical tennis ball impacting a real physical tennis racket.

FIG. 19 illustrates a representative flow diagram for determining an intersection with an object image. In step 1902 a left stereoscopic projection image is filtered for a left camera of the headset. In step 1904 a right stereoscopic projection image is filtered for a right camera of the headset. The filter of step 1902 and 1904 may be based on active shutter or polarization technology at the headset or based on autostereoscopic technology at the display. Step 1906 determines a location of the object image in the projected stereoscopic image relative to the headset. Step 1908 determines a position, location and/or orientation of a physical object. The determination of step 1908 may be made by processing the images received by the cameras, or other approaches for making such a determination regarding a physical object. Step 1910 (optionally) renders a stereoscopic extension image of the physical object at the headset. In step 1912 the determination is made whether or not the stereoscopic extension image or the physical object indicates and intersection with the object image. If so, then step 1914 enables a process based upon determining the intersection. The process may include modifying the stereoscopic extension image, launching an application at the headset or other connected device, generating an alert (audio, visual, tactile or otherwise), generating an output signal for reception by another device, and modifying the stereoscopic projection image projected by the display separate from the headset. Note that in this process, in an example where the stereoscopic extension image of step 1910 image is not required, then projectors 1456 and 1457 are not required in the headset in order to determine an intersection between the physical object and the object image.

Figure 20:
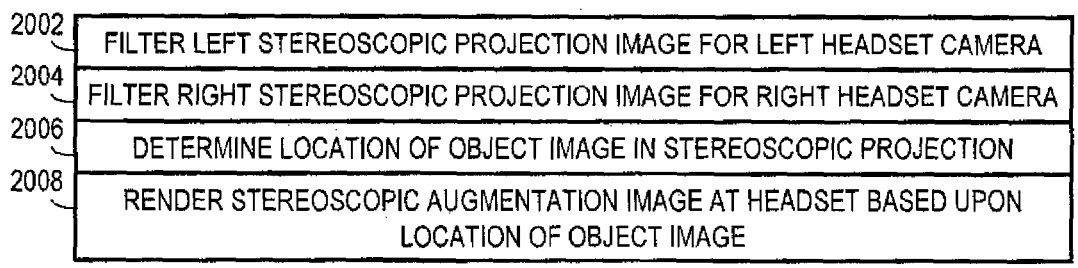
FIG. 20 illustrates a representative flow diagram for augmenting an object image projected by a stereoscopic display with a stereoscopic image rendered by a headset.

FIG. 20 illustrates a representative flow diagram for augmenting an object image projected by a stereoscopic display with a stereoscopic image rendered by a headset. In step 2002 a left stereoscopic projection image is filtered for a left camera of the headset. In step 2004 a right stereoscopic projection image is filtered for a right camera of the headset. The filter of step 2002 and 2004 may be based on active shutter or polarization technology at the headset or based on autostereoscopic technology at the display. Step 2006 determines a location of the object image in the projected stereoscopic image relative to the headset. Step 2008 renders the stereoscopic image, or stereoscopic augmentation image at the headset based upon the determined location of the object image. Note that in this process, a physical object and its intersection with the object image need not be determined.

FIG. 21 illustrates a representative diagram of multiple observers observing and intersecting an object image projected by a stereoscopic display. Display 1402 is rendering a stereoscopic object image 2105 while being simultaneously observed by three observers 2110, 2120, and 2130. The object image is perceived at location 2115 by observer 2110 wearing headset 2112, and is perceived at location 2125 by observer 2120 wearing headset 2122, and is perceived at location 2135 by observer 2130 wearing headset 2132. Observer 2110 is shown intersection object image 2115 with physical object 2117 corresponding to the finger of the observer. In determining the intersection, the headset 2112 determines the location of the object image 2115 relative to the headset and the location of the physical object 2117. Observer 2120 is shown with physical object 2127 which may be a wand or pointer held by the observer. The headset 2122 determines the location, orientation and/position of the physical object 2127 and renders a stereoscopic extension image 2129 based on the physical object. In this example the stereoscopic extension image appears as a laser beam emanating from the wand or pointer. Since the physical object 2127 is not indicating an intersection with object image 2125, no intersection is detected, and stereoscopic extension image 2129 is rendered as longer than the distance to the object image 2125. Observer 2130 is shown with physical object 2137 which may be a wand or pointer held by the observer. The headset determines the location, orientation and/position of the physical object and renders a stereoscopic extension image 2139 based on the physical object. In this example the stereoscopic extension image appears as a laser beam emanating from the wand or pointer. Since the physical object 2137 is indicating an intersection with object image 2135, an intersection is detected, and stereoscopic extension image 2129 is rendered with a length terminating at the object image 2135. This gives the observer the perception that laser beam 2139 is hitting object image 2135.

The difference in length between stereoscopic extension image 2129 and stereoscopic extension image 2139 shows another example of how a stereoscopic image rendered by the headset can be modified based upon determining an intersection. Stereoscopic image 2129 has a first length, and in response to a determined intersection a process is enabled that adjusts the length of the stereoscopic image 2139 to correspond to the intersection with the object image. Thus, a stereoscopic image rendered by the headset is modified in response to an intersection with an object image projected by a stereoscopic display. In another example, headset 2112 detects an intersection between a physical object 2117 and an object image 2115, and headset 2132 detects an intersection between a physical object 2137 indicating and intersection with an object image 2135 (stereoscopic extension image 2139 notwithstanding). Furthermore, in another example where stereoscopic image 2139 was rendered by headset 2132 independent of any physical object 2123, then headset 2132 would detect an intersection between a stereoscopic image 2139 rendered by the headset and an object image 2135 projected by the display.

Furthermore, observers 2110, 2120 and 2130 are able to independently interface with object image 2105. The laser beam 2129 is only visible to observer 2120 because it is rendered by headset 2122 and is not projected by display 1402. This is contrasted with laser beam 372 of FIG. 3A which is visible to both observers 300 and 350 even though laser beam 372 does not appear to be emanating from physical object to observer 300. In one example, stereoscopic display 1402 is a three dimensional display at a movie theater and the object image is a button that says "push for popcorn". Observers 2110 and 2130 are indicating a desire for popcorn by indicating an intersection with the object image. In response, headsets 2112 and 2130 communicate the desire for popcorn by enabling a process that communicates a signal indicative of the order for popcorn to a wireless server within the movie theater. Further, object image 2105 could be one of several object images simultaneously projected by display 1402 allowing theater patrons to order concession such as popcorn, soft drinks and candy. Many other examples of applications of the system of this description may be realized while remaining within the scope of the description. Furthermore, in this and other examples, an object image, such as object image 2105, may be located in the plane of display 1402, thereby appearing as a two dimensional object displayed by a conventional non-stereoscopic two dimensional display, in which case display 1402 need not be a stereoscopic display.

FIG. 22 illustrates and example of a flow diagram for determining intersections with an object image projected by a stereoscopic display and determined to be located in multiple locations relative to each of the multiple headsets. Step 2202 determines a location of an object image in stereoscopic projection at a first headset. Step 2204 then determines the orientation, position and/or location of a first physical object. Step 2206 then (optionally) renders a first stereoscopic extension image of the first physical object at the first headset. If the first physical object and/or the first stereoscopic extension image indicates an intersection with the object image at the first location at step 2208, then step 2210 enables a first process. The first process may include modifying the stereoscopic extension image, launching an application, generating an alert, generating an output signal, and/or modifying the stereoscopic extension image. Step 2212 determines a second location of the object image in stereoscopic projection at a second headset. Step 2214 then determines the orientation, position and/or location of a second physical object. Step 2216 then (optionally) renders a second stereoscopic extension image of the second physical object at the second headset. If the second physical object and/or the second stereoscopic extension image indicates an intersection with the object image at the second location at step 2218, then step 2220 enables a second process. The second process may include modifying the stereoscopic extension image, launching an application, generating an alert, generating an output signal, and/or modifying the stereoscopic extension image. Thus, FIG. 22 shows a process where multiple observers wearing multiple headsets can independently interface with a common object image projected by a single stereoscopic display. The single stereoscopic display need not monitor physical objects associated with each of the multiple observers. In this example, hundreds or even thousands of observers in a theater or large conference room or other facility can independently interface with one or more object images projected by a single stereoscopic display.

In a brief summary example, a method comprises receiving, at a headset, an object image projected by a stereoscopic display separate from the headset, the headset configured to enable the object image and a physical object to be simultaneously observed by an observer wearing the headset; determining a perceived location of the object image relative to the headset; determining the physical object indicating an intersection with the determined location of the object image; and enabling a process based upon the determining of the intersection. The method further comprising: receiving, at a second headset, the object image projected by the stereoscopic display separate from the second headset, the second headset configured to enable the object image and a second physical object to be simultaneously observed by a second observer wearing the second headset; determining a second perceived location of the object image relative to the second headset; and determining the second physical object indicating a second intersection with the determined second location of the object image; and enabling a second process based upon the determining of the second intersection. The process communicates a signal indicative of the intersection to a device controlling the projection of the object image upon the display, and the second process communicates a second signal indicative of the second intersection to the device controlling the projection of the object image upon the display. The method further comprising: rendering, at the headset, a stereoscopic extension image based upon the physical object, wherein the process modifies the stereoscopic extension image based upon the determined intersection. The process communicates a signal indicative of the intersection to a device controlling the projection of the object image by the stereoscopic display. The process modifies the object image. The headset includes a camera system configured to receive a camera image including the object image and an image of the physical object and the determining the location of the object image is based upon the camera image, and the determining the physical object indicating the intersection is based upon the camera image. The camera system includes a left camera and a right camera and the object image includes a left image combined with a right image, and the method further includes: filtering, at the headset, the left image from the object image for both the left camera and a left eye of the observer; and filtering, at the headset, the right image from the object image for both the right camera and a right eye of the observer. The camera system includes a left camera and a right camera and the object image includes a left image directed towards a left eye of the observer and a right image directed towards a right eye of the observer, and the method further includes: receiving, at the headset, the left image with the left camera; and receiving, at the headset, the right image with the right camera.

In another brief summary example, a method comprises: receiving, at a headset, an object image projected by a stereoscopic display separate from the headset; determining a perceived location of the object image relative to the headset; and rendering, at the headset, a stereoscopic image based upon the location of the object image, whereby the stereoscopic image augments the object image. The object image is projected based upon a first database and the stereoscopic image is rendered based upon a second database, at least a portion of which is not included in the first database. The stereoscopic image at least partially augments the object image based upon the portion of the second database not included in the first database. The method further comprising the step of generating, at the headset, an obstruction area adapted to block at least a portion an image projected by the stereoscopic display. The method further comprising the step of generating, at the headset, an obstruction area adapted to block at least a portion of the object image, wherein the stereoscopic image rendered by the headset is at least partially rendered within the obstruction area. The method further comprising: receiving, at the headset, a physical object image of a physical object; determining a location of the physical object relative to the headset; and rendering, at the headset, a second stereoscopic image based upon the location of the physical object. The stereoscopic image at least partially augments the object image, and the second stereoscopic image at least partially augments the physical object. The physical object, the stereoscopic display projecting the object image, the object image, the stereoscopic image, and the second stereoscopic image are able to be simultaneously viewed by an observer wearing the headset.

In another brief summary example, a method comprises: receiving, at a headset, an stereoscopic projection having an object image, the stereoscopic projection rendered upon a display separate from the headset; determining a location of the object image relative to the headset; rendering, at the headset, a stereoscopic image; determining the stereoscopic image indicating an intersection with the determined location of the object image; and enabling a process based upon the determining of the intersection. The enabling the process includes modifying the stereoscopic image rendered at the headset. The enabling the process includes transmitting a signal indicative of the intersection to a device external to the headset.

In another brief summary example, a headset comprises: a right camera; a right image filter configured to filter a right eye image of a stereoscopic projection for reception by the right camera and for viewing by a right eye of an observer wearing the headset; a left camera; and a left image filter configured to filter a left eye image of the stereoscopic projection for reception by the left camera and for viewing by a left eye of the observer wearing the headset. The right image filter includes: a first right image filter configured to filter the right eye image of the stereoscopic projection for viewing by the right eye of the observer; and a second right image filter configured to filter the right eye image of the stereoscopic projection for reception by the right camera, and the left image filter includes: a first left image filter configured to filter the left eye image of the stereoscopic projection for viewing by the left eye of the observer; and a second left image filter configured to filter the left eye image of the stereoscopic projection for reception by the left camera. The left image filter and the right image filter include at least one of a polarized filter and an active shutter filter. The stereoscopic projection includes an object image and the headset further comprises: an object detector coupled to the right camera and the left camera configured to determine a location of the object image relative to the headset; and an intersection determiner configured to determine a physical object indicating an intersection with the determined location of the object image. The right image filter is further configured to enable viewing, through the right image filter, a physical object by the right eye of the observer wearing the headset, and the left image filter is further configured to enable viewing, through the left image filter, the physical object by the left eye of the observer wearing the headset. The stereoscopic projection includes an object image, the right camera further receives a right perspective image of the physical object, the left camera further receives a left perspective image of the physical object, and the headset further comprises: an object detector coupled to the right camera and the left camera configured to determine a location of the physical object based upon the right perspective image and the left perspective image, the object detector further configured to determine a location of the object image relative to the head set; and an intersection determiner configured to determine the physical object indicating an intersection with the determined location of the object image.

In a summary, the disclosure also includes an abstract summary where a headset renders stereoscopic images that augment either physical object viewed through the headset, or virtual objects projected by a stereoscopic display separate from the headset, or both. The headset includes a system for locating both physical objects and object images within a stereographic projection. The headset also includes a projector for projecting a stereographic image capable of augmenting the physical object, the object image projected by the stereographic display, or both. The headset includes obstruction filter for obstructing portion of the stereographic projection for enhanced augmentation of image projected by the stereographic display. The headset includes an intersection determiner for determining if an intersection has occurred between an object image projected by the stereographic display and either a physical object, a stereographic image rendered by the headset, or both. In response to the intersection determined at the headset, a process may be enabled in either the headset, a device controlling stereographic display, or another device external to the headset.

III. Proprioceptive User Interface

Figure 23:
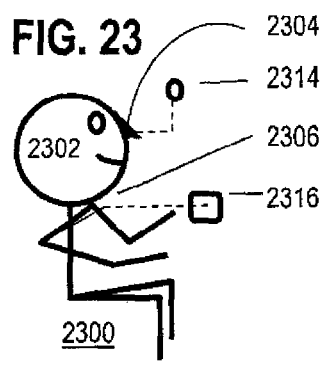
FIG. 23 shows a side view of an observer having a proprioceptive user interface.

Turning now to the proprioceptive user interface, FIG. 23 shows a side view of an observer interfacing with a proprioceptive user interface. The observer 2300 is show in a seated position and at times interfaces with a system able to realize the features of a proprioceptive user interface. The observer has body parts such as a head 2302, a nose 2304, a shoulder 2306 as well as a neck and an eye. In the proprioceptive user interface, interface locations are positioned relative a body part. Circular interface location 2314 is shown to be forward and up relative to the nose 2304 of the observer and square interface location 2316 is shown to be forward relative to the shoulder 2306 of the observer. Left or right locations relative to the observer are not shown in the side view of FIG. 23. The interface location moves as the body part moves. The interface location is associated with a function or process implemented by the proprioceptive user interface. The function or process is implemented when a physical object either intersects the interface location or indicates an intersection with the interface location, such as with an extension vector or a stereoscopic extension image. Since the interface location relative to a body part remains substantially constant, the observer becomes familiar with the interface location relative to the body part, as an extension of the body part, and may activate the function without requiring a display system to render an icon or interface object at the interface location. This frees the observer's field of vision from unnecessary clutter and reduces requirements of a display system associated with the proprioceptive user interface to render interface icons for use with the interface. For example, eliminating a requirement to render icons or interface objects on a system with a stereoscopic display terminal, such as terminal 102 of FIG. 1 allows for interface locations to remain functional even though their location may be beyond the limited projection space of the stereoscopic display. Also, for interface locations within the limited projection space of the terminal, since an icon or object image need not be rendered, more display space may be available for other content being rendered. For example, a stereoscopic rendering of a simulation of an open heart surgery being practiced by a physician observer need not be obscured by icons or object images identifying various interface locations. For example an icons for scalpels or clamps need not displayed if their interface location is known by the physician using natural proprioception. Since the observer has become familiar with the interface locations through a human's natural proprioception abilities, their functionality or associated process may implemented by a physical object, such as the finger of the observer or wand held by the observer, indicating an intersection with the object image, even though no icon or object image is rendered at the interface location. The proprioceptive user interface enables this because the interface location is known by the observer to be relative to a body part of the observer.

The body part may be further identified with an element or a reference element. In one example, an element or reference element is a body part itself such as a head, nose, eye, neck or shoulder of the observer. In another example the element or reference element may be attached to or associated with a body part. Such an element may include one or more fiducial marks facilitating identification of a body part, such as a set of glasses worn by the observer with one or more reflective or radiative elements, such as the glasses of the zSpace terminal, to facilitate a determination of the body part by an imaging system associated with the system implementing the proprioceptive user interface. In such an example the proprioception interface locations would be located relative to the head of the observer. Also note that since relative positions of the eyes, and nose do not change relative to the head of the observer, such interface locations may also be considered relative to the eyes or nose (or other body parts included within the head) of the observer.

In another example, the reference element may be removably affixed to a body part of an observer, such as a headset or an article of clothing having a fiducial mark and worn by the observer. A physician wearing a surgeon garb may have an interface location in front of a shoulder indicating selection of a scalpel. The shoulder portion of the article of clothing may have a fiducial mark identifying the shoulder. If the physician is dressed in street clothes, then the interface location in front of the shoulder may control audio characteristics of an audio system to which the physician wishes to interface. Thus, the functionality of an interface location may be changed based upon garments or other items worn by the observer.

In another example, the reference element may be a head worn device including the imaging system. The imaging system determines the location of the interface system relative to the body part, and if the body part is the head of the observer and the headset is worn on the head of the observer, the interface location may be determined relative to the imaging system itself. The imaging system may further determine the physical object indicating an intersection with the interface location. The head worn device may also include a display system. Devices such as headsets are described by the Google Glass or the Atheer headset and have both imaging and display systems included within a head worn device. In these examples, the interface location 2314, 2316 may have a determined physical relationship with the reference element by being fixed is space relative to the reference element, and moving with the movement of the reference element.

The observer 2300 is shown reaching towards interface location 2316 with their left arm. Note that no icon or object image needs to be rendered at location 2316 because proprioception allows the observer to know the interface location is a fixed distance in front of the left shoulder 2306 of the observer. If the function or process enabled as a result of a physical object indicating an intersection with the interface location does not require a display system, then no display system is required. For example if the intersection were to enable a process in a music player to skip to the next song, then only a system for determining the interface location and corresponding intersection is required. Such a system may include an imaging system or other such system known to those familiar with the art. One advantage being that a display system need not be a requirement.

While interface locations may be placed relative to any body part, or even in coincidence with a body part, placing interface locations relative to the head or shoulders has a possible advantage of freeing the arms, hands, fingers, legs, feet and toes of the observer for other functions, such as walking, eating or other activities involving these extremities without activating the proprioceptive user interface. Furthermore, placing the interface locations a short distance away from the head and shoulder of the observer has a possible advantage of allowing for activities including personal hygiene like blowing of the nose of the observer without activating the proprioceptive user interface. In such an example, the interface locations may be placed within an arm's length of the observer or between two centimeters and fifty centimeters of the eye of the observer. Another potential advantage includes placing the interface locations so they appear within the peripheral vision of the observer to enable visual location of the physical object, such as a finger of the observer, intersection a perceived location of the interface location. For example an interface location two centimeters to the left and two centimeters forward of the left eye of the observer may be within the peripheral vision of the observer, enabling the observer to see a finger of the observer's left hand intersecting the interface location without occupying the primary field of vision directly in front of the observer.

Furthermore, interface locations in close proximity with an observer's face shoulders are generally considered by many social norms to be within the personal space of the observer, a space which is generally not accessed by others. Thus the proprioceptive user interface may be considered a very personal—personal user interface—not only because it need not be displayed, but further because it is located in a space that generally not accessed persons other than the user.

Figure 24A:
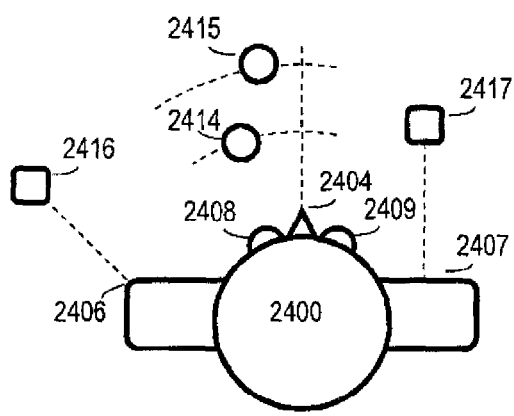
FIG. 24A and FIG. 24B show a proprioceptive user interface having interface locations relative to various body parts that move with the various body parts.
Figure 24B:
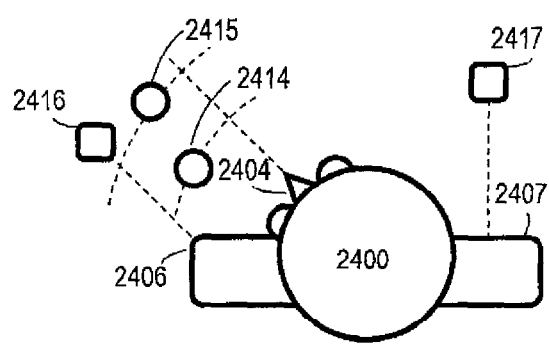

FIG. 24A and FIG. 24B show a proprioceptive user interface having interface locations relative to various body parts that move with the various body parts. FIG. 24A shows an observer 2400 having body parts including a nose, 2404, a left shoulder 2406, a right shoulder 2407, a left eye 2408 and a right eye 2409. The head of the observer is facing forward. Interface location 2414 is shown relative to the nose 2404 of the observer as being forward and to the left, and interface location 2415 is shown relative to the observer as being farther forward and less far to the left as interface location 2414. The left shoulder 2406 is shown as having an interface location 2416 that is forward and to the right relative to the left shoulder, and right shoulder 2407 is shown as having an interface location 2417 that is forward relative to the right shoulder.

FIG. 24B shows the head of observer being turned to the left relative to the shoulders of the observer. Note that interface locations 2416 and 2417 remain constant relative to FIG. 24A because the shoulders 2406 and 24047 of the observer remain in the same position. However, interface locations 2414 and 2415 have rotated with the head or nose 2404 of the observer. Even though interface locations 2414 and 2415 have moved relative to interface locations 2416 and 2417, the observer may use proprioception to intersect the interface locations without the aid of an augmentation of the interface location by a display system rendering an icon or interface image at the interface location, because the interface location relative to their associated body parts remains even though the observer may be regularly changing positions. The observer uses natural proprioceptive abilities to know the current location of the observer body parts and extends the knowledge to know the relative locations of the interface locations without the aid of augmentation of the interface location.

Figure 25A:
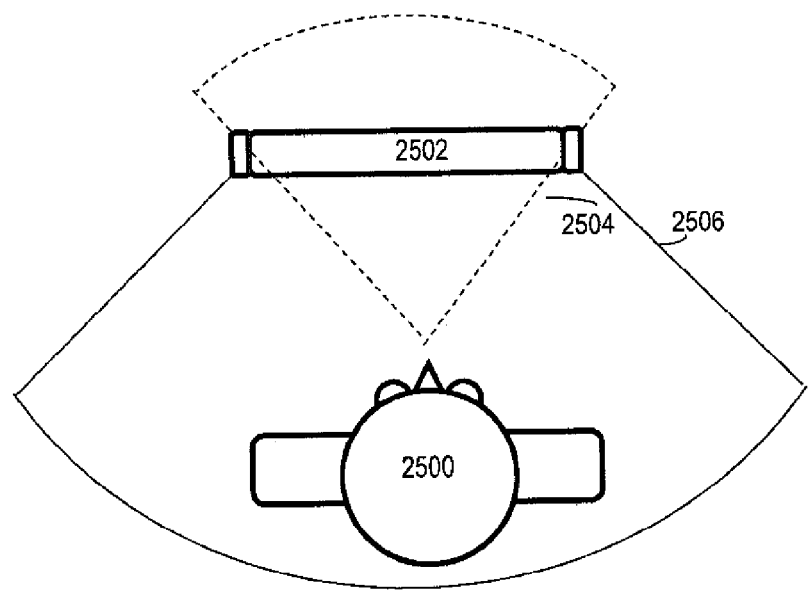
FIG. 25A, FIG. 25B and FIG. 25C illustrate examples of limited projection space and imaging space of various devices able to implement a proprioceptive user interface.
Figure 25B:
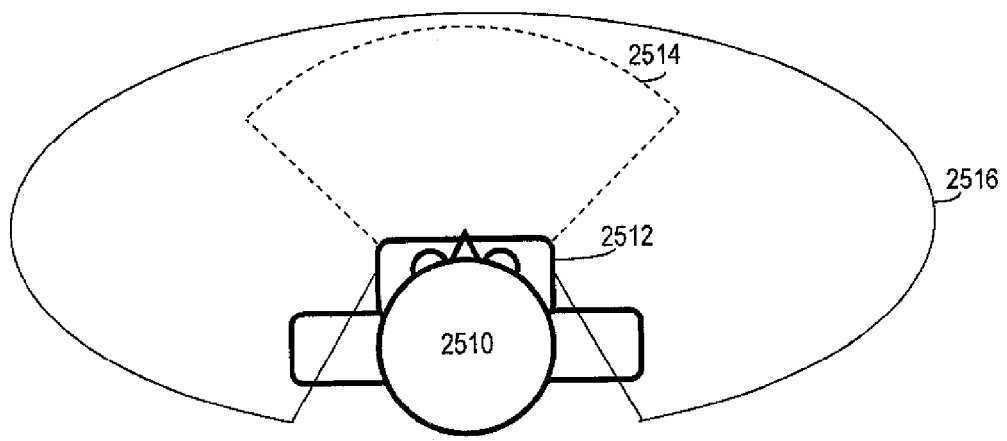
Figure 25C:
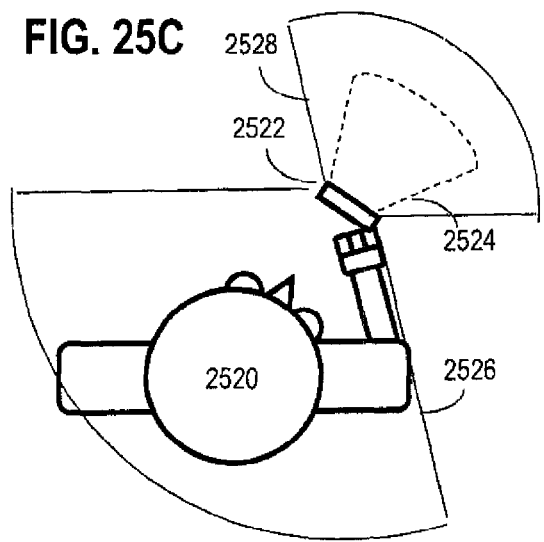

FIG. 25A, FIG. 25B and FIG. 25C illustrate examples of limited projection space and imaging space of various devices able to implement a proprioceptive user interface. FIG. 25A shows an example of a stereoscopic display terminal 2502 similar to terminal 202 of FIG. 2 for implementing a proprioceptive user interface. Based upon the position of observer 2500, the stereoscopic display has a limited projection space 2504 for rendering stereoscopic images. The limited display space is based on the size of the display and the volume in which stereoscopic images can be generated. The volume between the observer and the display is limited to the space in which both eyes of the observer have a view of the display. Stereoscopic images rendered by the stereoscopic display have many uses, some of which have been described herein, and further uses may include augmenting interface locations of the proprioceptive user interface with an icon or object image if the interface location is within the limited projection space of the stereoscopic display. The object image may nevertheless not be rendered at the interface location even though the interface image is within the limited projection space: one reason for not rendering the object image is that the observer is familiar with the location of the interface location and does not require the object image to be rendered. This leave more display space or display volume or area for the rendering of other content by the display system, while maintaining the functionality of the interface location.

On the other hand, the object image may be rendered at the interface location in order, for example, to facilitate learning or refreshing knowledge of interface locations for the observer. The object image may not be rendered if the observer is familiar with the interface location relative to an observer's body part using proprioception. The imaging system has an imaging space 2506 which is shown to be larger than the limited projection space. This allows for determination of the reference element associated with the body part, the interface location as well as determination of a physical object indicating an intersection with the interface location by the imaging system whether or not the interface location is beyond the limited display area 2504. The imaging system may include a camera array, either infrared, visible or ultraviolet, for determining the location of the body part of the observer or the reference element is itself the body part to which the interface location in relative to. Other approaches to locating interface locations relative to body parts and/or reference elements associated with body parts are considered to be within the scope of this description.

FIG. 25B shows an example of an observer 2510 wearing a head mounted device 2512 such as head mounted device 1400 of FIG. 14. The headset display system has a limited projection space 2514 as defined by the display system of the headset and a larger image space 2516 as defined by the imaging system of the headset. The larger imaging space shown in FIG. 25B may be realized by additional cameras directed towards the shoulders of the observer. The larger imaging space allows the head mounted device to determine the location of a body part of the observer, such as a shoulder of an observer. Since the device is worn on the head, the head worn device itself may be viewed and a reference element associated with a body part of the observer, wherein the body part is the head of the observer. The head worn device moves as the head of the observer moves and the interface locations move with the headset. Thus interface locations relative to the head of the observer may also be considered as relative to the headset when the observer is wearing the headset having a substantially constant location on the head of the observer. Similar to the terminal of FIG. 25A, an interface location within the limited display space 2514 of the headset may be augmented with an object image rendered by the headset, or need not be augmented based perhaps upon the observer's familiarity with the proprioceptive user interface.

Figure 26:
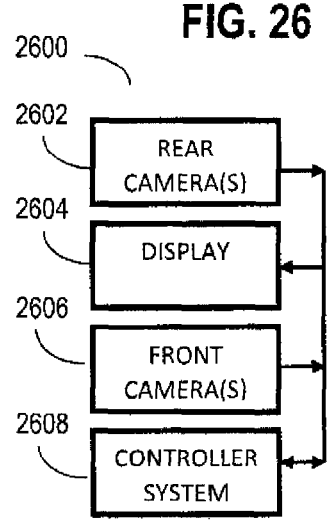
FIG. 26 shows an example of a basic block diagram of the portable device having a proprioceptive user interface.

FIG. 25C shows an example of an observer 2520 holding a handheld or portable device, such as the device of FIG. 26, which may be a cellphone, smart phone, tablet, handheld gaming device or other portable device having a proprioceptive user interface. The device has a limited display space 2524 which is shown extending to the rear of the device, and a rear imaging space 2526 for determining an interface location relative to a reference element associated with a body part of the observer. In this example, if an interface location is within the limited display space 2524, then it may or may not be augmented with a rendering by device, 2522. The portable device has the further advantage in that it may itself be the physical object that indicates an intersection with the interface location. Also, the device may include a front imaging space 2528 for determining if other physical objects, such as the other hand of the observer, are indicating an intersection with the interface location.

In other examples, the limited projection space may extend forward and rearward, and the display may be a stereoscopic display (3D) rendering three dimensional objects or may be two dimensional display rendering a three dimension depth perspective (2.5D) of an object image augmenting the interface location.

FIG. 26 shows an example of a basic block diagram of the portable device having a proprioceptive user interface. Portable device 2600 includes a rear imaging system 2602, which may include one or more cameras, and a display. The rear imaging system has a rear imaging space as shown by space 2526 of FIG. 25C. Cellphones, tablets and laptops commonly have displays and rear cameras for facilitating a number of operations including video conferencing and self-portrait photographs. The arrangement allows the portable device to receive an image of an observer observing the display. The display may be a stereoscopic display or a conventional two dimensional display. A front imaging system 2606 receives images in front of the device and may be used for receiving images of physical objects indicating an intersection with an interface location or general purpose photography available on most cell phones. The front imaging system may include one or more cameras. The device also includes a controller system 2608 which may have components similar to the components of the block diagrams of FIG. 2 and FIG. 14 for determining interface locations, body part locations, physical objects, intersections and rendering images. The device may include an observer locator for determining the location of the observer as well as reference elements associated with body parts of the observer based upon images captured by the imaging system, an interface location determiner to determine interface locations based upon the reference elements identified from images of the imaging system. It may also include an object image rendering determiner able to determine if an interface locations occurs within the limited projection space of the display system.

Figure 27A:
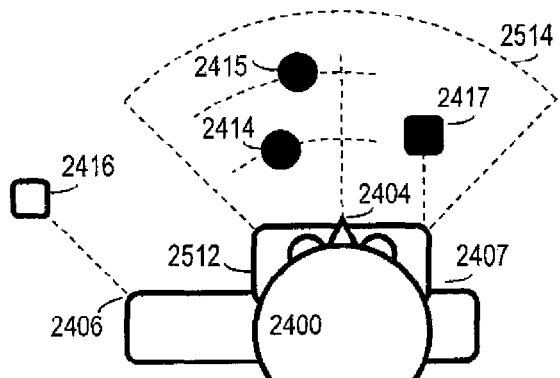
FIG. 27A and FIG. 27B show an example of an operation of a proprioceptive user interface for an observer wearing a head mounted device such as a headset.
Figure 27B:
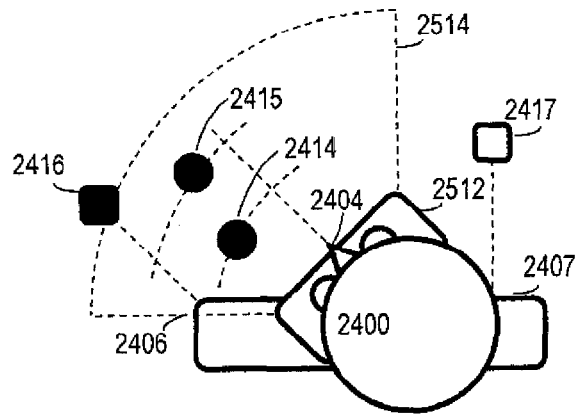

FIG. 27A and FIG. 27B show an example of an operation of a proprioceptive user interface for an observer wearing a head mounted device such as a headset. Observer 2400 is wearing a headset 2512, similar to headset 1400 of FIG. 14. Headset 2512 is implementing the proprioceptive user interface of FIG. 24. Interface locations 2414 and 2415 are located relative to the headset, which is worn by the observer on the nose 2404 of the observer and is thus relative to a body part of the observer, which in this example is the nose of the observer. Interface location 2417 is located forward relative to the right shoulder 2407 of the observer. Interface location 2416 is located forward and to the left of the left shoulder 2406 of the observer. Interface locations 2414, 2415, and 2417 are located within the limited projection space 2514 of the headset display system and are shown as filled circles and rectangles. Interface location 2416 is beyond the limited display projection space 2514 and is shown as an unfilled rectangle. Interface locations 2414, 2415, and 2417 may or may not be augmented with an object image rendered by the display system of the headset because they are located within the limited projection space 2514. The augmentation may be dependent upon the observer's familiarity with the proprioceptive user interface. The observer may prefer the augmentation while learning the proprioceptive user interface and thereafter manually disable the augmentation because the observer has become familiar with the interface locations relative to the body parts of the observer. In another example, the augmentation may be temporarily enabled based upon the physical object either indicating an intersection with the interface location or approaching an intersection with the interface location. Thus, as a physical object gets close to the location of the interface image, augmentation of the interface location may be enabled and an object image rendered.

FIG. 27B shows the observer's head rotated to the left. Interface location 2417 is no longer within the limited projection space 2514 of the headset and is shown as an unfilled rectangle. Interface location 2416 is now within the limited projection space 2614 of the headset and is shown as a filed rectangle. Interface locations 2414 and 2415 move relative to the nose of the observer and thus rotate with the headset. These figures show that interface locations located relative to the head of the observer may remain in the limited projection space of an observer wearing a headset, while interface locations located relative to other body parts may be viewed by the head movements (or movements of the shoulders) of the observer that bring the interface location within the limited projection space of the headset.

As previously described the headset includes an imaging system capable of locating the reference body parts, such as shoulders 2406 and 2407, and is able to detect a physical object indicating an intersection with the interface location. In one example, the physical object may be a finger of the observer, or a wand held by an observer. The physical object may indicate an intersection with the interface location by, for example, directly intersecting the interface location or by pointing towards the intersection and the line of the point may be augmented with a laser beam or other end effect. Other methods of indicating an intersection are within the scope of this description.

Figure 28A:
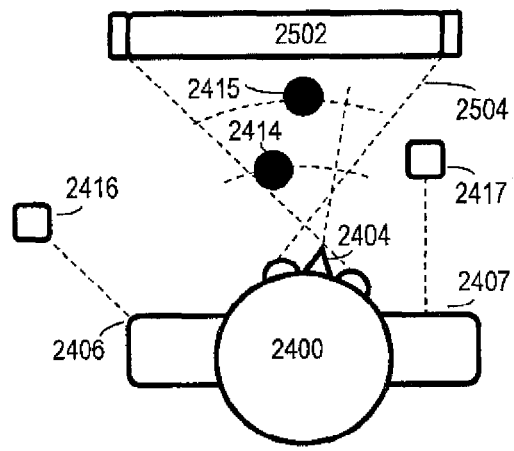
FIG. 28A and FIG. 28B show an example of an operation of a proprioceptive user interface with an observer viewing a stereoscopic terminal.
Figure 28B:
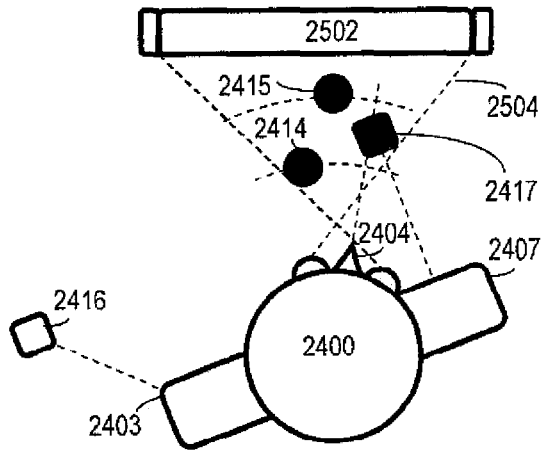

FIG. 28A and FIG. 28B show an example of an operation of a proprioceptive user interface with an observer viewing a stereoscopic terminal. In this example the observer of FIG. 27 may have removed headset 2512 and is now observing stereoscopic terminal 2502. Note that interface locations 2414-2417 remain constant relative to the reference elements associated with the various body parts of the observer even though the observer of FIG. 27 is wearing a headset and the observer of FIG. 28 is observing a stereoscopic terminal. Terminal 2505 is similar to the block diagram of the terminal of FIG. 8 and is operating with a proprioceptive user interface. Interface locations 2414 and 2415 are shown to be within the limited projection space 2504 of the stereoscopic terminal in both FIG. 28A and FIG. 28B. Thus object images may be rendered by the terminal to augment these interface locations. Interface location 2417 is shown to be beyond the limited projection space 2504 in FIG. 28A. In FIG. 28B the observer has rotated their right shoulder 2407 to move the interface location 2417 to occur within the limited projection space 2504. Moving in such a way as to locate interface location 2417 within limited projection space 2504 may enable the observer to discover or refresh their familiarity with the location and/or functionality of interface location 2417 as it is located relative to the right shoulder 2407. Interface location 2416 in not within the limited projection space 2504 in either FIG. 28A or FIG. 28B. However, the imaging space of the imaging system of terminal 2502 enables the terminal to determine the locations of interface locations 2414-2417 whether or not the interface locations are within the limited projection space 2504. Thus, the observer may cause a physical object to indicate an intersection with any of the interface locations whether or not they are augmented with object images and whether or not they are within the limited projection space of the terminal.

FIG. 29 shows a portable device having a display system and operating a proprioceptive user interface. Observer 2400 is holding a portable device 2522 which may be a cell phone, tablet, personal computer, portable gaming system or other device operating a proprioceptive user interface and may have a block diagram similar to the device of FIG. 26. The observer of FIG. 29 may be the same observer of FIG. 27 and FIG. 28, but in FIG. 29, the observer may have set aside the headset and terminal and in this example is using a cell phone to operate the proprioceptive user interface. Interface locations 2414-2417 remain constant relative to their reference element associated with a respective body part of the observer. The portable device has a display and is located between the observer and interface locations 2415 and 2417. The portable device has a camera system facing the observer and is able to determine observer body part locations from which interface locations are relatively located. Interface locations 2415 and 2417 are located within the limited display space of the display and thus may be augmented by rendering interface objects appearing to the observer to be located at the interface locations, the augmentation occurring by images rendered on the display of the portable device. The display of the portable device may be a stereoscopic display, or may be a two dimensional display rendering interface objects in 2.5D to give appropriate depth perception to the object images.

FIG. 30 shows object images rendered on the display of the portable device of FIG. 29 that augment the interface locations within the limited display area 2524 of the portable device. The display 2406 shows interface location 2417 being augmented by rendering a rectangular image appearing to occur at a location corresponding the interface location from the perspective of the observer. Similarly since interface location 2415 is behind interface location 2417 from the perspective of the observer, the object image augmenting interface location 2415 is rendered to appear behind the object image rendered to augment interface location 2417. The observer may move the location of the portable device to enable augmenting of other interface locations by moving the limited display space to include other interface locations. For example, rotating or moving the portable device to the left would allow for augmentation of interface location 2414, while further rotation or moving to the left would allow for augmentation of interface location 2416.

FIG. 31 shows an example of the portable device of FIG. 29 operating a proprioceptive user interface that is rendering an object image augmenting an interface location while acting as a physical object for indicating an intersection with the interface location located relative to a body part of an observer. With reference to FIG. 29, the observer has moved the portable device forward in order to cause the portable device to intersect with interface location 2417, which is located relative to the right shoulder 2407 of the observer. In response to the intersection, a process based upon the intersection is enabled. For example, interface location 2417 could indicate a muting or unmuting of audio produced by the portable device, and the object image augmenting the interface location could appear as a speaker when the portable device is muted and as a speaker with cross or circle with a slash over the speaker when the portable device is unmuted. Thus, if the portable device is muted, the intersection of the portable device with interface location 2417 would enable a process to unmute the portable device audio, and if the portable device is unmuted, the intersection of the portable device with interface location 2417 enable a process to mute the portable device audio.

In another example, the portable device could indicate the intersection with interface location 2417 without actually intersecting interface location 2417. If the display of FIG. 30 included a touch screen, then the intersection could be indicated by the device receiving a touch input on the touch screen corresponding to the area on the display of FIG. 30 used for rendering an object image for augmenting interface location 2417. Alternately, a track pad, track ball, mouse or other type of user input receiver may be used in place of a touch screen for indicating an intersection with an interface location.

FIG. 32 shows an example of the portable device of FIG. 29 operating a proprioceptive user interface that is not necessarily rendering an object image augmenting an interface location while acting as a physical object for indicating an intersection with the interface location located relative to a body part of an observer. FIG. 32 is different from FIG. 31 in that interface location 2417 does not need to be augmented with a rendered object image because the observer is not viewing the portable device. Another reason that the object image need not be rendered includes the observer not requiring augmentation do to the familiarity with the interface location. Even though the object image is not augmented and/or the observer is not looking towards the interface location, the portable device is able to determine the location of the right shoulder 2407 of the observer, the location of interface location 2417 relative to the right shoulder and that the portable device 2522 intersecting the interface location 2417. A corresponding interface action is taken upon determination of the intersection of portable device 2522 with interface location 2417.

In one example application, the portable device is being used as a speaker phone on a conference call and interface location 2417 enables a process that mutes or unmutes the portable device. While on the conference call, the observer decides to have a conversation with another person located to the left of the observer. The observer turns to the left to enable the conversation, while moving the portable device through the interface location 2417, and in response to the intersection of the portable device with the interface location, the speaker and/or microphone of the portable device is muted, thereby enabling a conversation with the other person to the left of the observer. The observer proprioceptive knowledge of the interface location relative to the right shoulder of the observer allows the observer to cause the intersection without looking at the portable device or without looking in the vicinity of the interface location. If the observer needs to refresh their knowledge of the interface location and/or its function, then the portable device can be used to augment the interface location with an object image that indicates the location and function of the interface location. Furthermore, the observer's knowledge may be refreshed by other display systems such as the headsets and terminals described herein.

FIG. 33A and FIG. 33B show an example of a stereoscopic terminal operating a proprioceptive user interface wherein an interface location is moving with a body part of the observer and the observer is intersecting an interface location with either a left hand or a right hand. In this example, the observer retains the proprioceptive user interface of FIG. 24, and FIG. 27-FIG. 32, and is interfacing with a stereoscopic terminal similar to the block diagram of FIG. 8. As in FIG. 28A, interface locations 2416 and 2417 are beyond the limited projection space of the terminal. In FIG. 33A, interface locations 2414 and 2415 are beyond the limited projection space because the observer's head is turned to the left. In FIG. 33B, interface locations 2414 and 2415 are beyond the limited projection space because the observer's head is turned to the right. In FIG. 33A the observer 2400 is using a finger of the left hand 3310 to indicate an intersection with interface location 2414, and in FIG. 33B the observer 2400 is using a finger of the right hand 3320 to indicate an intersection with the same interface location 2414. A process related to interface location 2414 is enabled in response to either the left handed intersection of FIG. 33A or the right handed intersection of FIG. 33B.

In one example, an intersection of interface location 2414 may be considered a manual input that generates a manual input signal that enables a process that toggles the rendering of object images that augment interface locations. Thus, the observer of FIG. 33A could intersect interface location 2414 with the right hand 3310 a first time and augmentation of interface locations would be enabled and any interface location occurring within the limited projection space of the terminal 2502 would be augmented with an object image rendered by the stereoscopic terminal. A second intersection of interface location 2414 with the right hand would enable a process that toggled the described augmentation, which in this continuing example results in disabling the augmentation. In a similar example, the observer of FIG. 33B could intersect interface location 2414 with a finger of the left hand and again enable the process that toggles the augmentation of interface locations. Note that in the example of FIG. 33, none of the interface locations 2414-2417 would be augmented because they are not shown as located within the limited projection space of the terminal. However, applying the same example to FIG. 28A, an intersection with interface location 2414 would result in enabling a process that toggles the rendering of object images augmenting interface locations 2414 and 2415. In other examples, other processes can be enable based on the intersection with an interface location.

FIG. 33A and FIG. 33B show that an imaging system can determine locations of body parts, relative locations of interface locations and physical objects indicating intersections with interface locations even though the interface locations are not augmented with object images and even though the interface locations are not located within the limited projection space of the stereoscopic terminal. The observer's natural proprioceptive abilities provide for this potential advantage. Furthermore, an interface location may be intersected with any of a number of different motions. In this example, the same interface location is intersected by fingers of the left and right hands, and the same process is enabled based on the determined intersection, rather than a specific motion or gesture on the part of the observer. The observer may also indicate the intersection with another physical object such as a wand, and/or the intersection may be the result of a pointing operation and the line of the pointing direction augmented with a stereoscopic extension, as previously described. Thus, the process enabled based upon the determined intersection may be implemented by any of a number of motions by the observer, none of which need be a predefined gesture motion.

Figure 34:
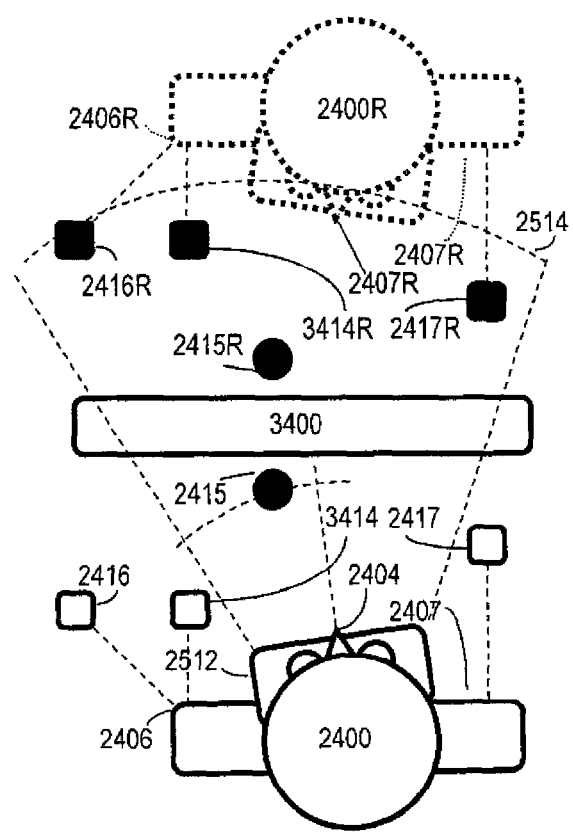
FIG. 34 shows an example of an observer wearing a head mounted device observing a reflection of the observer in a mirror with interface locations of the reflection augmented with object images rendered by the head mounted device.

FIG. 34 shows an example of an observer wearing a head mounted device observing a reflection of the observer in a mirror with interface locations of the reflection augmented with object images rendered by the head mounted device. The imaging system of the headset 2512 captures an image of the observer in the mirror, determines the location of reference elements associated with body parts in the reflection, determines reflection interface locations relative to the body parts of the reflected image and augments the reflection interface locations. In this example, interface location 2415 is relative to the nose 2404 of the observer 2400, and reflection interface location 2415R is relative to the reflection of the nose 2404R of the observer 2400R. Interface location 2416 and new interface location 3414 are located relative to the left shoulder 2406 of the observer 2400, and reflection interface location 2416R and 3414R are relative to the reflection of the left shoulder 2406R of the observer 2400R. The reflection interface locations 2414R-2417R and 3414R are within the limited projection space 2514 of the headset and are shown and filled rectangles and a filled circle because they are augmented with object images rendered by projectors in the headset 2512 to appear as if they are relative to the reflection of the observer. Interface locations 2416, 2417 and 3414 are beyond the limited projection space 5814 of the headset 2512 and are shown as unfilled rectangles because they are not augmented. Interface location 2415 is within the limited projection space of the headset and is shown as a filled circle and may or may not be augmented with an object image rendered by the headset. Not augmenting interface location 2415 may enhance the observer's perspective of the reflection because the reflection is not obscured by the rendering of an object image appearing to be between the observer and the mirror.

Figure 35:
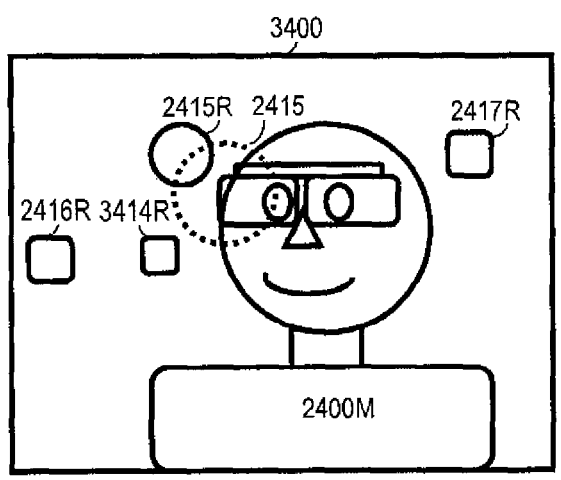
FIG. 35 shows an example of a perceived image of an observer wearing a head mounted device looking at an observer reflection in a mirror, wherein the reflection is augmented with object images rendered by the headset to indicate reflected interface locations.

FIG. 35 shows an example of a perceived image of an observer wearing a head mounted device looking at an observer reflection in a mirror, wherein the reflection is augmented with object images rendered by the headset to indicate reflected interface locations. The observer views the reflection of the observer 2400M in the mirror 3400. In the reflection 2400M, nose of the observer may be considered a reflected body part. The reflection 2400M is not rendered by the headset, but is an image of the observer reflected in the mirror 3400. The reflection interface locations 2415R, 2416R, 2471R, and 3414R are augmented with object images rendered by the headset to appear, from the perspective of the observer, as reflected object images at the locations of the reflection interface locations relative to the reflection body parts of the observer reflection 2400M. One possible advantage of augmenting the reflection of the observer is to enable the observer to better learn or refresh their understanding of the proprioceptive user interface. For example, due to the limited projection space 2514 of the headset 2512, the observer may not be able to simultaneously observer all interface locations of the proprioceptive user interface of FIG. 34. The distance between interface location 2416 and 2417 is greater than the limited projection space of the headset when worn by the observer. However, in the reflection of the observer, the observer can see object images rendered to augment all interface locations, thereby enhancing understanding of the proprioceptive user interface. The observer may also practice intersecting interface locations by observing the reflection of the observer intersecting the reflected interface locations that are augmented.

Furthermore, if the interface locations are movable relative to reference elements associated with body parts of the observer, and if the observer may change the location of an interface locations relative to a body part, similar to the way icons may be reorganized on a desktop of a two dimensional a graphical user interface, such as the graphical user interface provided by the Microsoft Windows operating system, then the use of the reflection of FIG. 35 has the possible advantage of simplifying and enhancing relocation of interface locations that may otherwise be beyond the limited projection space of the observer, because additional interface locations may be viewed in the mirror reflection. Changing or editing locations of interface locations may also include changing the body part to which the interface locations are made relative. For example, interface location 2414 is relative to the nose of the observer, and may have been changed by the observer to interface location 3414 which is relative to the left shoulder of the observer. The process enabled by an intersection with interface location 2414 or interface location 3414 (such as toggling augmentation of interface images), may remain the same even though the reference body part may have been changed when the observer moved the interface location.

Figure 36:
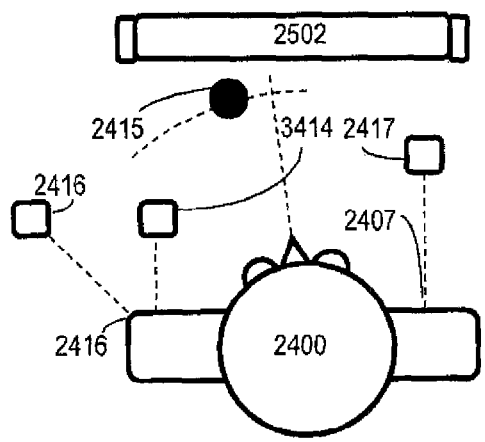
FIG. 36 shows an example of an observer observing a display terminal rendering a mirror image of the observer with interface locations of the mirror image augmented with object images rendered by the display terminal.

FIG. 36 shows an example of an observer observing a display terminal rendering a mirror image of the observer with interface locations of the mirror image augmented with object images rendered by the display terminal. FIG. 36 is similar to FIG. 34 in may aspects, a primary difference is that the observer of FIG. 34 is viewing a mirror through a head worn device and the observer of FIG. 36 is observing a display terminal 2502 and a mirror and a head worn device are not required. The display terminal may be a 3D stereoscopic display terminal or may be a two dimensional display rendering 2.5D image giving the observer a perception of depth.

Figure 37:
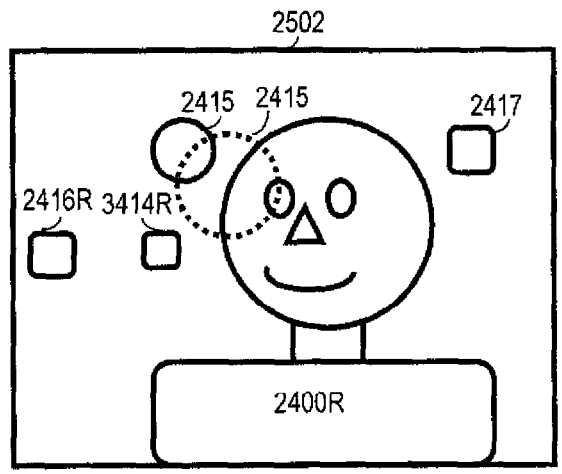
FIG. 37 shows an example of a perceived image of an observer viewing a display terminal rendering a mirror image of the observer wherein the mirror image of the observer is augmented with object images rendered by the display terminal to indicate reflected interface locations.

FIG. 37 shows an example of a perceived image of an observer viewing a display terminal rendering a mirror image of the observer wherein the mirror image of the observer is augmented with object images rendered by the display terminal to indicate reflected interface locations. FIG. 36 is similar to FIG. 34 in many aspects, a primary difference is that image 2400M is a mirror reflection of the observer and image 2400R is a rendering of a mirror image of the observer by the display of the terminal. Also, the observer of image 2400R is not necessarily wearing a headset. The potential advantages and benefits associated with the images of FIG. 35 also apply to the images of FIG. 37. FIG. 36 and FIG. 37 also share the benefit of nor requiring a head worn device and not requiring a display capable of stereoscopic projection to realize the possible benefits of FIG. 34 and FIG. 35 because the display may be either a 3D stereoscopic display or a 2D display rendering a 2.5D image.

Further note that the benefits of a proprioceptive user interface do not require a display, and may be realized with a system able to determine an interface location relative to a reference element of a body part of an observer and able to determine a physical object indicating an intersection with the interface location. Such a system may be a previously described imaging system which may or may not be associated with a display system. Since the observer gains a natural understanding of the proprioceptive user interface, a display may not necessarily be required to benefit from its application. For example, a home stereo audio system may include an imaging system having cameras for observing the observer and no corresponding display system. An observer within the imaging space of the imaging system and using a physical object to indicate an intersection interface location 2414 (building on a prior example) may mute or unmute the audio system. In other words, the observer raises his finger to intersection with a location in front of and to the left of the observer's nose mutes or unmutes the audio system. This is a proprioceptive action that the user has learned and the audio system has been provided with the programming to enable the muting and unmuting process. Similar to icons on a personal computer desktop, the location and function of each interface location may be unique to the observer and need not be standardized across multiple observers desiring to interface with device having a proprioceptive user interface.

Figure 38:
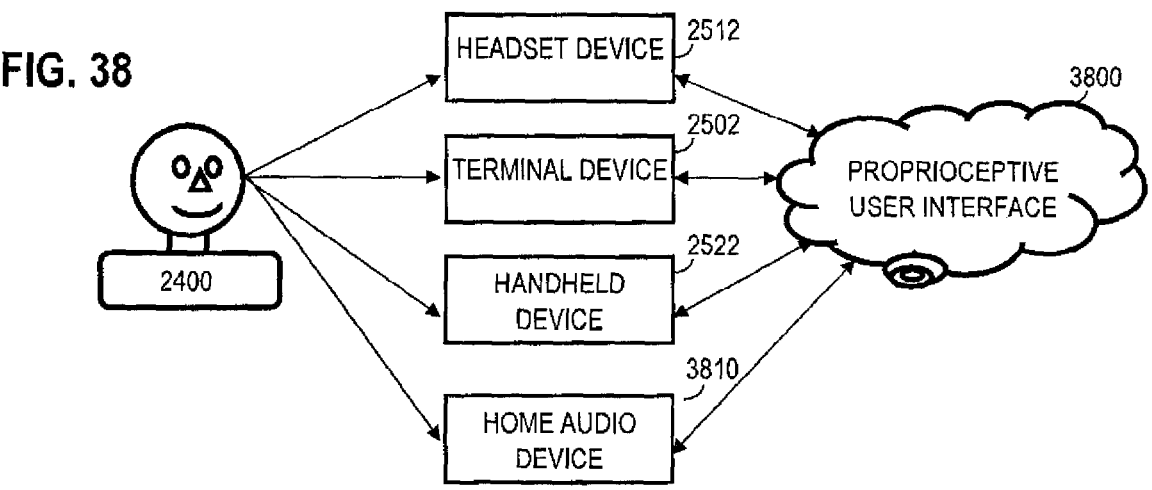
FIG. 38 shows a block diagram illustration of a system for providing a portable proprioceptive user interface able to allow an observer to interface with a number of devices using a common proprioceptive user interface.

FIG. 38 shows a block diagram illustration of a system for providing a portable proprioceptive user interface able to allow an observer to interface with a number of devices using a common proprioceptive user interface. The observer's personal proprioceptive user interface configuration may be stored in a remote data base 3800 such as a cloud having information for implementing the proprioceptive user interface on any of a number of device. The database may include various body parts of the observer, reference elements, relative locations of interface locations and various processes to be enabled in response to detection of an intersection with an interface location. The remote database may be a process operating in a cloud, such as a process operating on servers coupled to the Internet. The data for implementing the personal proprioceptive user interface is communicated from the remote database to each device the observer interface with. The observer may have an identification signal indicative of the observer in order that the proper database associated with the identification signal may be received by the device. The identification signal may be included within a Bluetooth signal generated by a cellphone carried by the observer. Other signals by other devices carried by the observer that identify the observer are considered to be within the scope of the description. The imaging system of the device may also capture an image of the observer, which may be used to identify the observer. An observer may interface with any of a number of devices including a headset device 2512, a terminal device 2502, a hand held or portable device 2522 or a home audio system 3810. The devices may be owned by the observer, or public terminals or kiosks for interfacing with the observer. One possible advantage of the system of FIG. 38 is that the proprioceptive user interface travels with the observer as the observer interfaces with various devices. The interface locations and processes enabled by the intersection with the interface locations may be constant from device to device, even though the observer may have before never interfaced with a particular device. As a further example, the each device may provide additional interface locations unique to the functionality of the device.

Since each proprioceptive user interface may be personalized to an individual observer, two observers may have identically located interface locations but the enabled process may be different for each observer. For example interface location 2414 for a first observer may enable a process that mutes or unmutes audio, while a second observer may have defined an interface location similar to interface location 2414 which may enable a process for fast forwarding an audio playback. In each case, the proprioceptive user interface for each user would be received from the remote database 3800, and each user may make the same proprioceptive intersection, even using the same motion gesture, and have different process enabled (muting vs. fast forwarding in this example).

In another example, a first observer may have a first interface location for enabling a muting and unmuting in a first location relative to a first body part, and a second observer may have a second interface location for enabling the muting and unmuting in a second location relative to a second body part of the second observer. In this example the proprioceptive user interface device receives the proprioceptive user interface for the first observer from the remote data base and enables the muting and unmuting process in response to a first physical object interfacing the first interface location relative to a body part of the first observer. Similarly, the proprioceptive user interface device receives the proprioceptive user interface for the second observer from the remote data base and enables the muting and unmuting process in response to a second physical object interfacing the second interface location relative to a body part of the second observer. Thus, in this example, two different observers may enable the muting process on a common device using two different interface locations and numerous different motions or gestures to indicate the intersection with the interface location.

Figure 39:
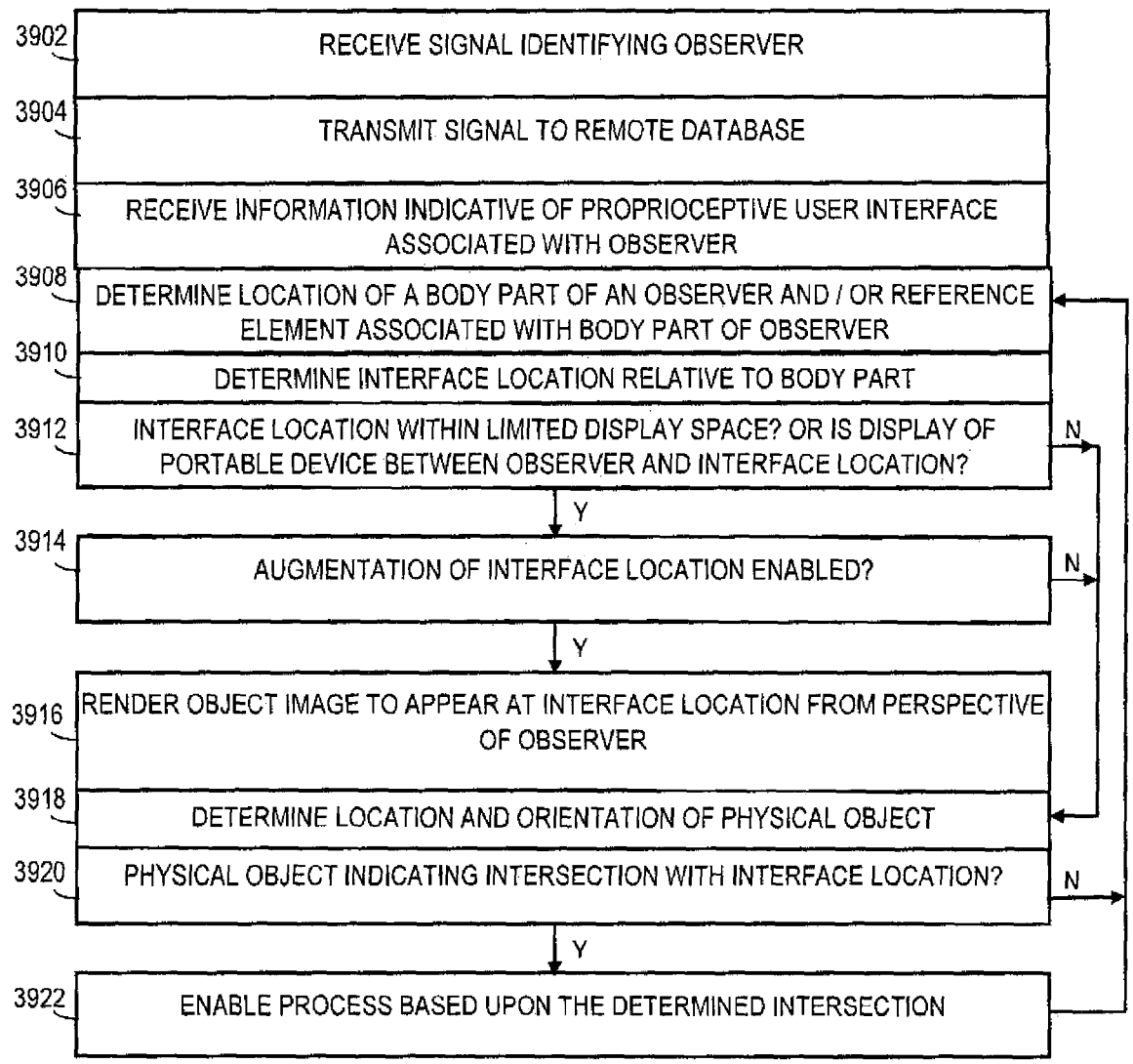
FIG. 39 shows a representative flow diagram of a process for realizing a proprioceptive user interface.

FIG. 39 shows a representative flow diagram of a process for realizing a proprioceptive user interface. In step 3902 a signal is received identifying the observer, which is communicated to a remote database at step 3904. Step 3906 then receives an observer signal having information indicative of the proprioceptive user interface associated with the observer. Steps 3902-3906 may be skipped if the device already has the information indicative of the proprioceptive user interface associated with the observer. Step 3908 then determines the location of a body part of the observer and/or reference element associated with the body part. Step 3910 then determines an interface location relative to the determination of step 3908. Step 3912 determines if the interface location is within the limited display space of the display system or if the display of a portable device is between the observer and the interface location. If so, then step 3914 determines if augmentation of the interface location is enabled. If so step 3916 enables rendering of an object image augmenting the interface location. Step 3918 then determines the location and optionally the orientation of a physical object and step 3920 determines if the physical object is indicating an intersection with the interface image. If so, then step 3922 enables a process based upon the determined intersection.

In one example, a method comprises: determining an interface location relative to a reference element associated with a body part of an observer; enabling, from a perspective of the observer, augmentation of the interface location with an object image rendered by a display system; disabling the augmentation of the interface location; determining a physical object indicating an intersection with the interface location when the augmentation is disabled; and enabling a process based upon the determined intersection. The method further comprising determining the physical object indicating the intersection with the interface location when the augmentation is enabled, whereby the process is enabled if the augmentation is either enabled or disabled. The display system has a limited projection space and the augmentation is enabled in based upon the interface location being within the limited projection space and the augmentation is disabled based upon the interface location being beyond the limited projection space. The display system includes an imaging system having an imaging space at least partially beyond the limited projection space wherein the determining the interface location is based upon an at least one image received by the imaging system and the interface location is beyond the limited projection space. The determining of the physical object intersecting with the interface location is based upon the at least one image received by the imaging system. The augmentation is disabled based upon a manual input signal. The observer has a head and a neck and the body part is included within at least one of the head and the neck of the observer. The head of the observer includes a nose and the body part is the nose of the observer. The reference element is a headset worn on and associated with the head of the observer, the headset including the display system adapted to render the object image for augmenting the interface location. The reference element includes at least one fiducial mark worn on the head of the observer and the display system includes a stereoscopic display terminal adapted to render the object image for augmenting the interface location. The display system is included within a handheld display device and the object image is rendered to appear at the interface location from the perspective of the observer based upon the display system being positioned between the head of the observer and the interface location. The observer has a body and the interface location is a distance from the body, the distance being such that the physical object indicating the intersection with the interface location does not result in the physical object making contact with the body of the observer as a result of the intersection. The observer has an eye and an arm having an observer arm's length and the reference element is the eye of the observer and the interface location is within the observer arm's length of the eye of the observer. The observer has an eye and the reference element is the eye of the observer and the interface location is between two centimeters and fifty centimeters from the eye of the observer. The method further comprising: determining a second interface location relative to a second reference element associated with a second body part of the observer; enabling, from the perspective of the observer, augmentation of the second interface location with a second object image rendered by the display system; disabling the augmentation of the second interface location; determining the physical object indicating a second intersection with the second interface location when the augmentation of the second interface location is disabled; and enabling a second process based upon the second intersection. The observer has a head and a shoulder and the body part of the observer corresponds to the head of the observer and the second body part of the observer corresponds to the shoulder of the observer. The reference element is a fiducial mark removably affixed with the body part. The observer has a head and the reference element is a headset removably affixed to the head of the observer. The observer has an eye and the reference element is the eye of the observer. The observer has nose and the reference element is the nose of the observer. The observer has a shoulder and the reference element is the shoulder of the observer. The method further comprising: determining a second interface location relative to the reference element; enabling, from the perspective of the observer, augmentation of the second interface location with a second object image rendered by the display system; disabling the augmentation of the second interface location; determining the physical object indicating a second intersection with the second interface location; and enabling a second process based upon the second intersection.

In another example, a method comprises augmenting a reflected image of an observer with a reflected object image appearing at a reflected interface location relative to a reflected element of a reflected body part of the observer included within the reflected image. The reflected image of the observer is an image of the observer reflected by a mirror. The reflected image of the observer is rendered by a display terminal. The method further comprising augmenting an image of the observer with an object image appearing at an interface location relative to an element of a body part of the observer.

In another example, a method in a portable device having a display system comprises: determining an interface location relative to a reference element associated with a body part of an observer of the display system; determining the display system to be located between the observer and the interface location; and augmenting, with the display system, the interface location with an object image from a perspective of the observer based upon the determining of the display system to be located between the observer and the interface location. The further comprising: determining the portable device indicating an intersection with the interface location; and enabling a process based upon the intersection. The portable device indicates the intersection with the interface location by being placed at the interface location. The portable device indicates the intersection based upon a manual input at the portable device indicative of a selection of the object image rendered on the display. The method further comprising: determining a physical object indicating an intersection with the interface location; and enabling a process based on the intersection.

In another example, a method comprises: determining, by a device separate from a head of an observer, an interface location relative to a reference element associated with the head of the observer; determining a physical object indicating an intersection with the interface location; and enabling a process based upon the determined intersection. The method further comprising selectively enabling and disabling, from a perspective of the observer, augmentation of the interface location with an object image rendered by a display system, whereby the process is enable if the augmentation is either enabled or disabled.

In another example, a method comprises determining an interface location relative to a reference element associated with a head of an observer, the interface location not augmented with an image indicative of the interface location; determining a physical object indicating an intersection with the interface location; and enabling a process based upon the determined intersection. The interface location is a distance from the head of the observer, the distance being such that the physical object indicating the intersection with the interface location does not result in the physical object making contact with the head of the observer. The method further comprising enabling, from a perspective of the observer, augmentation of the interface location with an object image rendered by a display system, whereby the process is enabled if the augmentation is either enabled or disabled.

In another example, a portable device comprises: a display system configured to render an object image; a first imaging system receiving an at least one image of an observer observing the display system the image having a reference element associated with a body part of the observer; an interface location determiner determining an interface location based upon the reference element of the at least one image; the display system configured to render the object image at the interface location from a perspective of the observer; an intersection determiner for determining if a physical object indicates an intersection with the interface location; and a controller configured to enable a process based upon the determined intersection. The physical object corresponds to the portable device. The portable device further comprising a second imaging system receiving an at least one second image including the interface location, wherein the intersection determiner determines if the physical object indicates the intersection with the interface location based upon the second image.

In another example, a device comprises: an observer locator configured to locate a reference element relative to a body part of an observer; an interface location determiner configured to determine an interface location based upon the reference element; a physical object detector for determining a physical object indicating an intersection with the interface location; and a controller configured to enable a process based upon the intersection. The device further comprising: a display system having a limited projection space; and an object image rendering determiner configured to determine that the interface location occurs within the limited projection space, wherein the display system renders an object image at the interface location from a perspective of the observer based upon the interface location occurring within the limited projection space. The display system is included within a headset worn by the observer. The physical object detector is included within the headset. The headset is the reference element when worn on the head of the observer, and the interface location determiner is included within the headset and the interface location determiner includes an imaging system for capturing an at least one image of the reference element.

In another example, a method comprises: determining a physical object indicating a first intersection with an interface location relative to a reference element associated with a body part of a first observer with a first imaging system; enabling a process based upon the first intersection determined with the first imaging system; determining the physical object indicating a second intersection with the interface location with a second imaging system; and enabling the process based upon the second intersection determined with the second imaging system. The method further comprising: receiving a manual input for setting the interface location for the relative to the reference element. The method further comprising: determining a second physical object indicating a second intersection with a second interface location relative to a second reference element associated with a body part of a second observer with the first imaging system; enabling the process based upon the second intersection determined with the first imaging system; determining the physical object indicating a second intersection with the interface location with a second imaging system; and enabling the process based upon the second intersection determined with the second imaging system.

In another example, a method comprises determining a first observer to be within an imaging space of an imaging system; determining a first physical object indicating a first intersection with a first interface location relative to a first reference element associated with a first body part of the first observer with the imaging system; enabling a process based upon the first intersection; determining a second observer to be within the imaging space of the imaging system; determining a second physical object indicating a second intersection with a second interface location relative to a second reference element associated with a second body part of a second observer with the imaging system, the first interface location relative to the first observer being different from the second interface location relative to the second observer; and enabling the process based upon the second intersection. The method further comprising receiving from a remote database a first observer signal indicative of the first reference element and the first interface location based upon the determining the first observer to be within the imaging space of the imaging system; and receiving from the remote database a second observer signal indicative of the second reference element and the second interface location based upon the determining the second observer to be within the imaging space of the imaging system. The imaging system includes a display system for rendering an object image and the method further comprising: augmenting, from a perspective of the first observer, the first interface location with the object image; and augmenting, from a perspective of the second observer, the second interface location with the object image.

In another example, a method comprises: determining a first observer to be within an imaging space of an imaging system; determining a first physical object indicating a first intersection with an interface location relative to a reference element associated with a first body part of the first observer with the imaging system; enabling a first process based upon the first intersection; determining a second observer to be within the imaging space of the imaging system; determining a second physical object indicating a second intersection with the interface location relative to the reference element associated with a second body part of the second observer with the imaging system, the second body part of the second observer corresponding to the first body part of the first observer, and the first interface location relative to the first observer corresponding to the second interface location relative to the second observer; and enabling a second process different from the first process based upon the second intersection.

In a summary, the disclosure also includes an abstract summary where a proprioceptive user interface defines interface locations relative to body parts of an observer, the body parts include the head and the shoulders of the observer. The observer may enable a process associated with the interface location by indicating an intersection with the interface location with a physical object, such as a wand or a finger of the observer. Proprioception allows the observer to know the location of the interface location without needing to observe the location as it is perceived as an extension of a body part of the observer. Consequently, an object image need not be rendered at the interface location by a display system. This provide additional display area for the display system and allows for interface locations to be placed outside a limited display space of the display system. Stereoscopic display systems are described, such display systems may be found in terminals and head worn devices. Also, portable devices such as cell phones may be used to operate the proprioceptive user interface.

IV. Non-Limiting Items

The present subject matter can also be embedded in a computer program product, which comprises all the features enabling the implementation of the methods described herein, and which, when loaded in a computer system, is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage and may be considered as non-transitory computer readable medium having a stored set of instructions that when executed implement processes described herein. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

Although specific embodiments of the subject matter have been disclosed, those having ordinary skill in the art will understand that changes can be made to the specific embodiments without departing from the scope of the disclosure. The scope of the disclosure is not to be restricted, therefore, to specific embodiments or examples, and it is intended that the appended claims define the scope of the present disclosure.

I claim:

1. A method comprising:
locating and tracking a movement of a reference element relative to a first movable body part of an observer;
determining a location of an interface location positioned relative to the reference element which is relative to the first movable body part of the observer;
determining a physical object controlled by a second movable body part of the observer indicating an intersection with the interface location when an object image is not rendered at the interface location relative to the reference element which is relative to the first movable body part of the observer by an augmentation system that had previously rendered the object image at the interface location relative to the reference element which is relative to the first movable body part of the observer;
enabling a process based upon the intersection which has been previously determined;
determining that the interface location occurs within a limited projection space of the augmentation system; and
augmenting the interface location relative to the reference element which is relative to the first movable body part of the observer by rendering the object image at the interface location when the interface location relative to the reference element which is relative to the first movable body part of the observer occurs within the limited projection space of the augmentation system, wherein the augmenting further includes selectively augmenting the interface location relative to the reference element which is relative to the first movable body part of the observer based upon an input signal, wherein the process is enable if the augmentation is either enabled or disabled based upon the input signal.

2. The method according to claim 1 wherein the augmentation system is included within a headset detachably worn by the observer.

3. The method according to claim 2 wherein the intersection is determined by a physical object detector included within the headset.

4. The method according to claim 2 wherein the intersection is determined by a physical object detector included within a device external to the headset.

5. The method according to claim 4 wherein the interface location is positioned by the device external to the headset.

6. The method according to claim 5 wherein the device external to the headset is a stationary terminal.

7. The method according to claim 1 further comprising receiving a signal indicative of the reference element, a position of the interface location, and the process to be enabled in response to detection of the intersection at the interface location and augmenting the interface location based upon the signal.

8. The method according to claim 1 wherein the object image includes an icon indicative of the enabled process.

9. A method comprising:
locating and tracking a movement of a reference element relative to a first movable body part of an observer;
determining a location of an interface location positioned relative to the reference element which is relative to the first movable body part of the observer;
determining a physical object controlled by a second movable body part of the observer indicating an intersection with the interface location when an object image is not rendered at the interface location relative to the reference element which is relative to the first movable body part of the observer by an augmentation system that had previously rendered the object image at the interface location relative to the reference element which is relative to the first movable body part of the observer;
enabling a process based upon the intersection which has been previously determined;
determining that the interface location occurs within a limited projection space of the augmentation system; and
augmenting the interface location relative to the reference element which is relative to the first movable body part of the observer by rendering the object image at the interface location when the interface location relative to the reference element which is relative to the first movable body part of the observer occurs within the limited projection space of the augmentation system, wherein the physical object controlled by the second movable body part includes a portable device having the augmentation system.

10. A method comprising:

locating and tracking a movement of a reference element relative to a first movable body part of an observer;

determining a location of an interface location positioned relative to the reference element which is relative to the first movable body part of the observer;

determining a physical object controlled by a second movable body part of the observer indicating an intersection with the interface location when an object image is not rendered at the interface location relative to the reference element which is relative to the first movable body part of the observer by an augmentation system that had previously rendered the object image at the interface location relative to the reference element which is relative to the first movable body part of the observer; and enabling a process based upon the intersection which has been previously determined, wherein the reference element is included within an article detachably worn on the first movable body part of the observer.

11. The method according to claim 10 wherein the article is an article of clothing.

12. The method according to claim 1 wherein the physical object controlled by the second movable body part includes a portable device having the augmentation system.

13. The method according to claim 1 wherein the reference element is included within an article detachably worn on the first movable body part of the observer.

14. The method according to claim 9 further comprising receiving a signal indicative of the reference element, a position of the interface location, and the process to be enabled in response to detection of the intersection at the interface location and augmenting the interface location based upon the signal.

15. The method according to claim 9 wherein the object image includes an icon indicative of the enabled process.

16. The method according to claim 9 wherein the portable includes a cell phone.

17. The method according to claim 10 wherein the augmentation system is included within a headset detachably worn by the observer.

18. The method according to claim 10 further comprising receiving a signal indicative of the reference element, a position of the interface location, and the process to be enabled in response to detection of the intersection at the interface location and augmenting the interface location based upon the signal.

19. The method according to claim 10 wherein the object image includes an icon indicative of the enabled process.

20. The method according to claim 10 wherein the physical object controlled by the second movable body part includes a portable device having the augmentation system.

* * * * *